United States Patent
Kitamaru et al.

(10) Patent No.: US 7,899,880 B2
(45) Date of Patent: Mar. 1, 2011

(54) INFORMATION PROCESSING APPARATUS, METHOD, PROGRAM, AND STORAGE MEDIUM FOR SYNCHRONIZING CONTENT

(75) Inventors: Yoshinobu Kitamaru, Kawasaki (JP); Tomohiro Fushimi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1169 days.

(21) Appl. No.: 11/582,320

(22) Filed: Oct. 18, 2006

(65) Prior Publication Data
US 2007/0097430 A1 May 3, 2007

(30) Foreign Application Priority Data
Oct. 31, 2005 (JP) ............................ 2005-316713

(51) Int. Cl.
G06F 15/16 (2006.01)
(52) U.S. Cl. .................. 709/217; 709/228; 709/227; 709/203; 709/204; 358/1.15; 358/302
(58) Field of Classification Search ........... 709/228, 709/227, 203, 217, 204; 707/104.1, 10; 358/1.15, 358/302
See application file for complete search history.

(56) References Cited

U.S. PATENT DOCUMENTS

| 7,533,125 | B2* | 5/2009 | Satomi et al. ................... 1/1 |
| 2003/0184653 | A1* | 10/2003 | Ohkubo ................ 348/207.1 |
| 2004/0078389 | A1* | 4/2004 | Hamilton ................ 707/104.1 |
| 2006/0044416 | A1 | 3/2006 | Miyazaki et al. ......... 348/231.2 |
| 2006/0230030 | A1* | 10/2006 | Volpa et al. ................ 707/3 |

FOREIGN PATENT DOCUMENTS

JP 11-154110 6/1999

* cited by examiner

*Primary Examiner*—Wing F Chan
*Assistant Examiner*—Hitesh Patel
(74) *Attorney, Agent, or Firm*—Fitzpatrick, Cella, Harper & Scinto

(57) ABSTRACT

This invention is to ensure synchronization between images in an information apparatus with those in an external device without bothering a user while reflecting the user's intension of whether to make an image open to the public. Only images in groups with the same group ID are synchronized without synchronizing albums in the information apparatus with albums in the external device. In addition synchronization processing is controlled by switching a flag indicating a flag to inhibit upload to the Web server.

6 Claims, 24 Drawing Sheets

F I G. 5
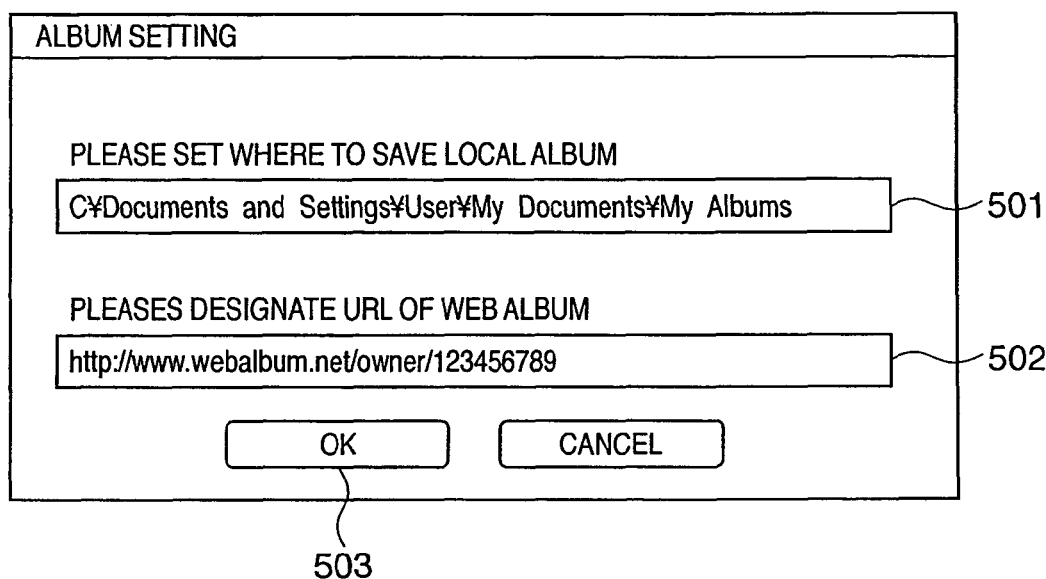

INFORMATION PROCESSING APPARATUS, METHOD, PROGRAM, AND STORAGE MEDIUM FOR SYNCHRONIZING CONTENT

BACKGROUND OF THE INVENTION

1. Field of the Invention

The present invention relates to an apparatus, method, program, and storage medium for efficiently managing an image.

2. Description of the Related Art

So-called online photo systems have recently become popular; they allow a user to upload images obtained with a camera to a Web server (to be referred to as a server hereinafter) and allow user's friends and acquaintances to access the Web server and view the images. In these systems, images move from a local personal computer (to be referred to as a "PC" hereinafter) to the server upon upload.

As the number of images increases, the work of uploading images to the server or deleting them from the server becomes cumbersome.

In order to prevent this, a method of synchronizing images stored in the local PC with those in the server is available. To synchronize data between apparatuses, conventionally, one apparatus refers to the contents of the other apparatus, and upon detecting a change in data, updates the data of its own to obtain data identical to the other apparatus (e.g., Japanese Patent Laid-Open No. 11-154110).

However, Japanese Patent Laid-Open No. 11-154110 discloses only an arrangement that reflects the data of the synchronization source on the data of the synchronization destination between the two apparatuses.

In an online photo system, normally, a user selects images to be on public view and uploads them to a server. Conversely speaking, the user uploads, to the server, no images to be kept in private.

The arrangement of Japanese Patent Laid-Open No. 11-154110 however uploads all images in the local PC to the server. To solve this problem, the user must select images or folders to be uploaded one by one, and for this, confirm images in the local PC and images in the server; the result is cumbersome.

SUMMARY OF THE INVENTION

The present invention has been made in consideration of the above-described problem, and has as its object to ensure synchronization between images in a local PC with those in a server without bothering a user while reflecting the user's intension of whether to make an image open to the public.

In order to solve the above-described problems and achieve the object, according to the first aspect of the present invention, there is provided an information processing apparatus comprising a first transmission unit which copies a plurality of contents stored in a storage device as groups and transmits each group of contents to an external device connected through a communication link, an instruction unit which instructs to synchronize the content stored in the storage device with the content transmitted by the first transmission unit and stored in the external device, a reception unit which receives, from the external device on the basis of the instruction, identification information to identify the group stored in the storage device, a comparison unit which compares the identification information received by the reception unit with the identification information to identify the group stored in the storage device, and a synchronization unit which synchronizes contents that belong to groups determined to have identical identification information compared by the comparison unit.

According to the second aspect of the present invention, there is provided an information processing apparatus comprising a first reception unit which receives, from an external device, an instruction to request identification information to identify a group containing a plurality of contents, a first transmission unit which transmits the identification information to the external device in response to the instruction received by the first reception unit, a second reception unit which receives, from the external device, an instruction to synchronize contents in a group corresponding to, of the identification information transmitted by the first transmission unit, identification information of a group stored in the external device, and a synchronization unit which synchronizes the contents on the basis of the instruction received by the second reception unit.

According to the third aspect of the present invention, there is provided an information processing method comprising a first transmission step of copying a plurality of contents stored in a storage device as groups and transmitting each group of contents to an external device connected through a communication link, an instruction step of instructing to synchronize the content stored in the storage device with the content transmitted in the first transmission step and stored in the external device, a reception step of receiving, from the external device on the basis of the instruction, identification information to identify the group stored in the storage device, a comparison step of comparing the identification information received in the reception step with the identification information to identify the group stored in the storage device, and a synchronization step of synchronizing contents that belong to groups determined to have identical identification information compared in the comparison step.

According to the fourth aspect of the present invention, there is provided an information processing method comprising a first reception step of receiving, from an external device, an instruction to request identification information to identify a group containing a plurality of contents, a first transmission step of transmitting the identification information to the external device in response to the instruction received in the first reception step, a second reception step of receiving, from the external device, an instruction to synchronize contents in a group corresponding to, of the identification information transmitted in the first transmission step, identification information of a group stored in the external device, and a synchronization step of synchronizing the contents on the basis of the instruction received in the second reception step.

According to the fifth aspect of the present invention, there is provided a program causing a computer to execute a first transmission step of copying a plurality of contents stored in a storage device as groups and transmitting each group of contents to an external device connected through a communication link, an instruction step of instructing to synchronize the content stored in the storage device with the content transmitted in the first transmission step and stored in the external device, a reception step of receiving, from the external device on the basis of the instruction, identification information to identify the group stored in the storage device, a comparison step of comparing the identification information received in the reception step with the identification information to identify the group stored in the storage device, and a synchronization step of synchronizing contents that belong to groups determined to have identical identification information compared in the comparison step.

According to the sixth aspect of the present invention, there is provided a program causing a computer to execute a first reception step of receiving, from an external device, an instruction to request identification information to identify a group containing a plurality of contents, a first transmission step of transmitting the identification information to the external device in response to the instruction received in the first reception step, a second reception step of receiving, from the external device, an instruction to synchronize contents in a group corresponding to, of the identification information transmitted in the first transmission step, identification information of a group stored in the external device, and a synchronization step of synchronizing the contents on the basis of the instruction received in the second reception step.

Further features of the present invention will become apparent from the following description of exemplary embodiments with reference to the attached drawings.

BRIEF DESCRIPTION OF THE DRAWINGS

FIG. 5 is a view showing an album setting window.

DESCRIPTION OF THE EMBODIMENTS

Preferred embodiments of the present invention will now be described in detail in accordance with the accompanying drawings. Note that each constituent element in the following embodiments is merely an example and does not intend to limit the scope of the invention.

First Embodiment

Figure 1:
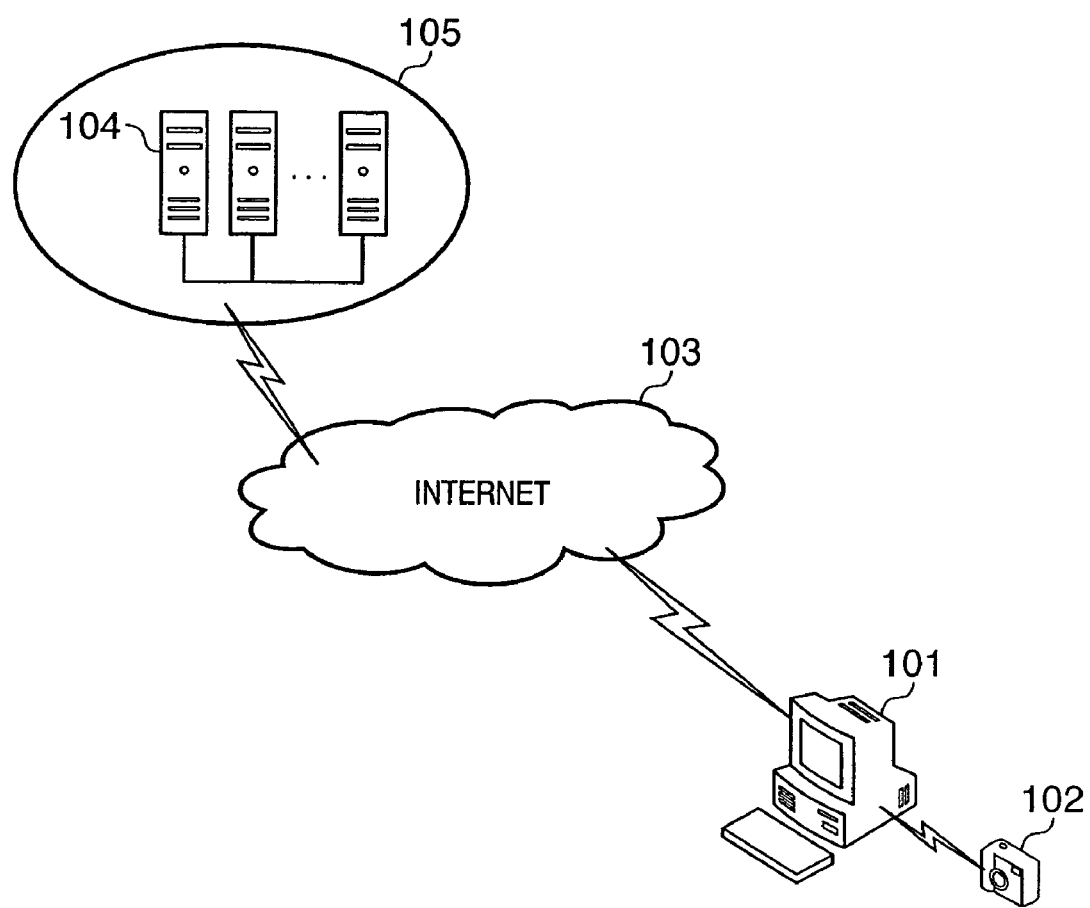
FIG. 1 is a view showing the outline of a system according to the first embodiment.

FIG. 1 is a view showing the outline of a system according to the first embodiment. Referring to FIG. 1, reference numeral 101 denotes a user communication terminal (to be referred to as a "user PC" hereinafter). The arrangement of the user PC 101 will be described later.

A digital camera 102 can transfer obtained images to the user PC 101 by wired or wireless communication. Although this embodiment exemplifies the digital camera 102, images read by a scanner may be transferred to the user PC 101.

A Web browser having a standard protocol capable of information transfer through the Internet 103 can run on the user PC 101. The user PC 101 can access a photo site 105 through the Web browser using the standard protocol such as an http protocol. The user PC 101 can display, on the screen, the contents of the photo site 105 through the Web browser in accordance with Web information created in a description language such as HTML (Hyper Text Markup Language).

The user PC 101 accesses a server 104 and executes user registration in the photo site 105. Upon user registration, the server 104 gives a my album URL, user ID, and password to the user PC 101. The server 104 stores these pieces of information. The my album URL indicates the location of the user's my album area. The my album area is an area on the server, which is unique to the user and saves a Web album (to be described later).

The server 104 communicates with the user PC 101 and transfers data in accordance with an instruction from the user PC 101.

Figure 2:
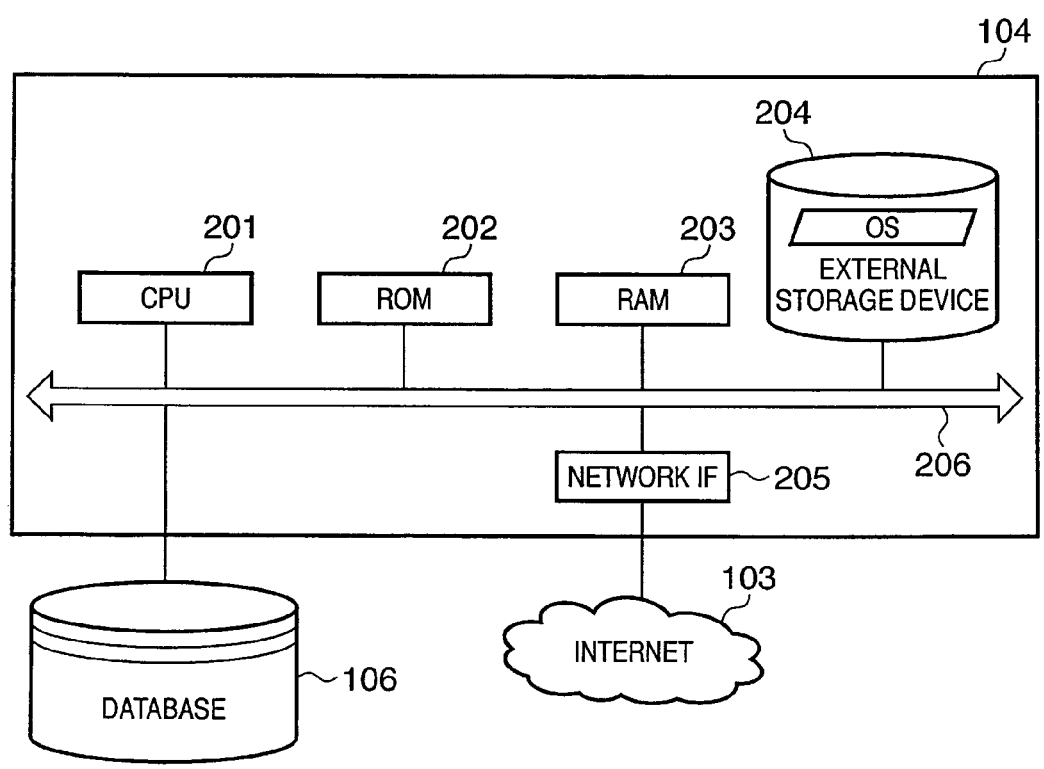
FIG. 2 is a view showing the hardware configuration of a server.

FIG. 2 is a view showing the hardware configuration of the server 104.

A CPU (Central Processing Unit) 201 controls devices connected to the CPU device on the basis of control programs stored in a ROM (Read Only Memory) 202 or external storage device 204.

The ROM 202 holds various kinds of control programs and data.

A RAM (Random Access Memory) 203 has the work area of the CPU 201, a data save area for error processing, and a control program load area.

The external storage device 204 can store the control programs and contents to be executed in the server 104. The external storage device 204 also stores the ID and password of the user who has registered in the photo site.

The external storage device 204 may be an internal device of the server 104 or a so-called externally attached storage device. FIG. 2 illustrates only one external storage device 204. However, the number of devices is not limited to one.

A network interface 205 (an interface will be referred to as an "IF" hereinafter) connects to the Internet 103 to communicate with another information processing apparatus such as the user PC 101.

Figure 3:
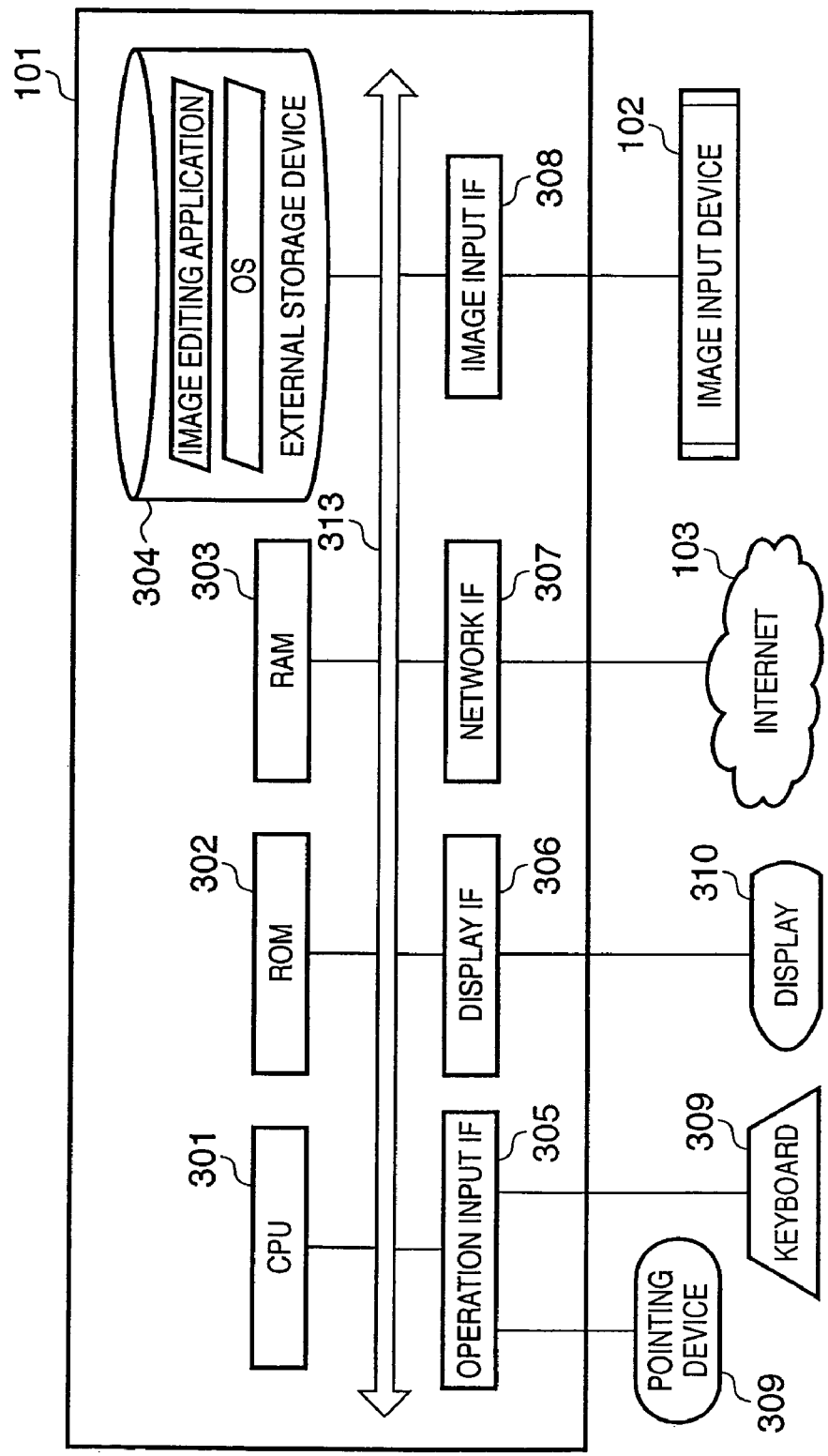
FIG. 3 is a view showing the hardware configuration of a user PC.

FIG. 3 is a view showing the hardware configuration of the user PC 101.

A CPU 301 controls devices connected to the CPU device on the basis of control programs stored in a ROM 302 or external storage device 304.

The ROM 302 holds various kinds of control programs and data.

A RAM (Random Access Memory) 303 has the work area of the CPU 301, a data save area for error processing, and a control program load area.

The external storage device 304 can store the control programs and contents to be executed in the user PC 101. The external storage device 304 stores, e.g., an image editing application, operating system (to be referred to as an "OS" hereinafter), and Web browser in addition to a local album and images.

The external storage device 304 may be an internal device of the user PC 101 or a so-called externally attached storage device. FIG. 3 illustrates only one external storage device 304. However, the number of devices is not limited to one.

An operation input IF 305 processes a signal input from an input device 309 (to be described later).

A display IF 306 outputs a signal to a display 310.

A network IF 307 connects to the Internet 103 to communicate with another information processing apparatus such as the server 104.

An image input IF 308 can communicate with an image input device such as the digital camera 102.

The display (display device) 310 displays, on a display screen, e.g., the editing information of a document, graphic, or image under editing and user interface information such as an icon, message, or menu.

FIG. 3 illustrates a keyboard and a pointing device as various kinds of input devices 309. The keyboard has various keys to input a document and the like. The user uses the pointing device to point at an icon, menu, or another object displayed on the display screen of the display 310.

Album management according to this embodiment will be described next. In this embodiment, an album groups a plurality of images to process them as one group.

A local album is an album saved in the local area, i.e., the external storage device 304 of the user PC 101.

A Web album is an album saved in the external storage device 204 of the server 104.

Figure 4:
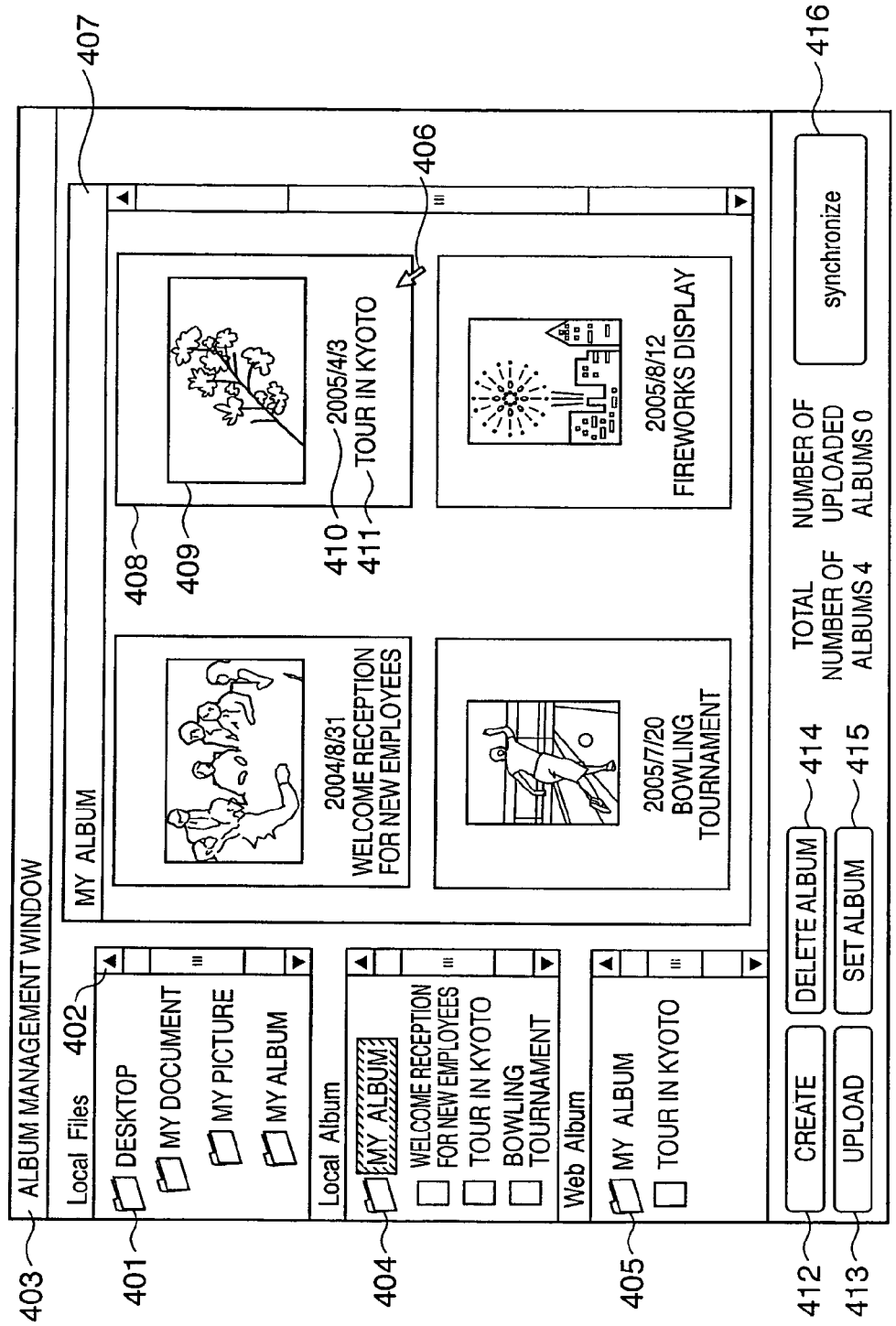
FIG. 4 is a view showing the album management window of an image editing application.

FIG. 4 is a view showing the album management window of an image editing application according to this embodiment.

An image has a low-resolution image and a high-resolution image, as will be described later. In this embodiment, a description about display of an image indicates display of a low-resolution image, unless otherwise specified.

First, a user operation activates the image editing application in the user PC 101.

The display 310 of the user PC 101 displays a local file display portion 401 after activation. The local file display portion 401 displays images saved in the external storage device 304 or digital camera 102 as a hierarchical structure using folders. If the local file display portion 401 cannot display all folders, the user moves a scroll bar 402 by using the input device 309 to see all folders.

A local album display portion 403 displays local albums currently saved in the user PC 101. In this embodiment, a my album folder 404 saves the local albums. Hence, the local album display portion 403 displays the my album folder 404 and album files in the folder.

A Web album display portion 405 displays albums saved in the server 104. The albums are displayed on the basis of information transmitted from the server 104 in synchronization processing (to be described later).

The user manipulates a pointer 406 by using the input device 309 and clicks on the my album folder 404 to display a local album list window 407. The local album list window 407 displays the list of covers 408 of albums currently saved in the my album folder 404. The album cover 408 shows a cover image 409, album creation date/time 410, and album title 411.

The user uses a new album creation button 412 to create a new album.

The user uses an upload button 413 to upload an album to the server 104. This processing will be described later.

Reference numeral 414 denotes an album deletion button. Album deletion processing will be described. The user manipulates the pointer 406 by using the input device 309 and clicks on the cover of an album to be deleted. The clicked album is selected to change its cover 408 to a bold frame. The user clicks on the album deletion button 414 to delete the selected album from the my album folder 404.

Reference numeral 415 denotes an album setting button. The user clicks on the album setting button 415 by using the input device 309 to display an album setting window shown in FIG. 5.

The user uses a synchronize button 416 for synchronization processing (to be described later).

Referring to FIG. 5, the user inputs a local album saving destination to a box 501. A newly created album is saved at the album saving destination input to the box 501. The saving destination is input and set in the box 501 automatically upon installing the image editing application in the user PC 101. To change the saving destination after installation, the user inputs a path to the box 501 in the album setting window and clicks on an OK button 503 to set the saving destination.

The user inputs a my album URL to a box 502. As described above, the area designated by the URL is the my album area where the user can save his/her Web album in the server 104.

Note that the external storage device 304 of the user PC 101 saves the album saving destination and my album URL set at this time.

Figure 6:
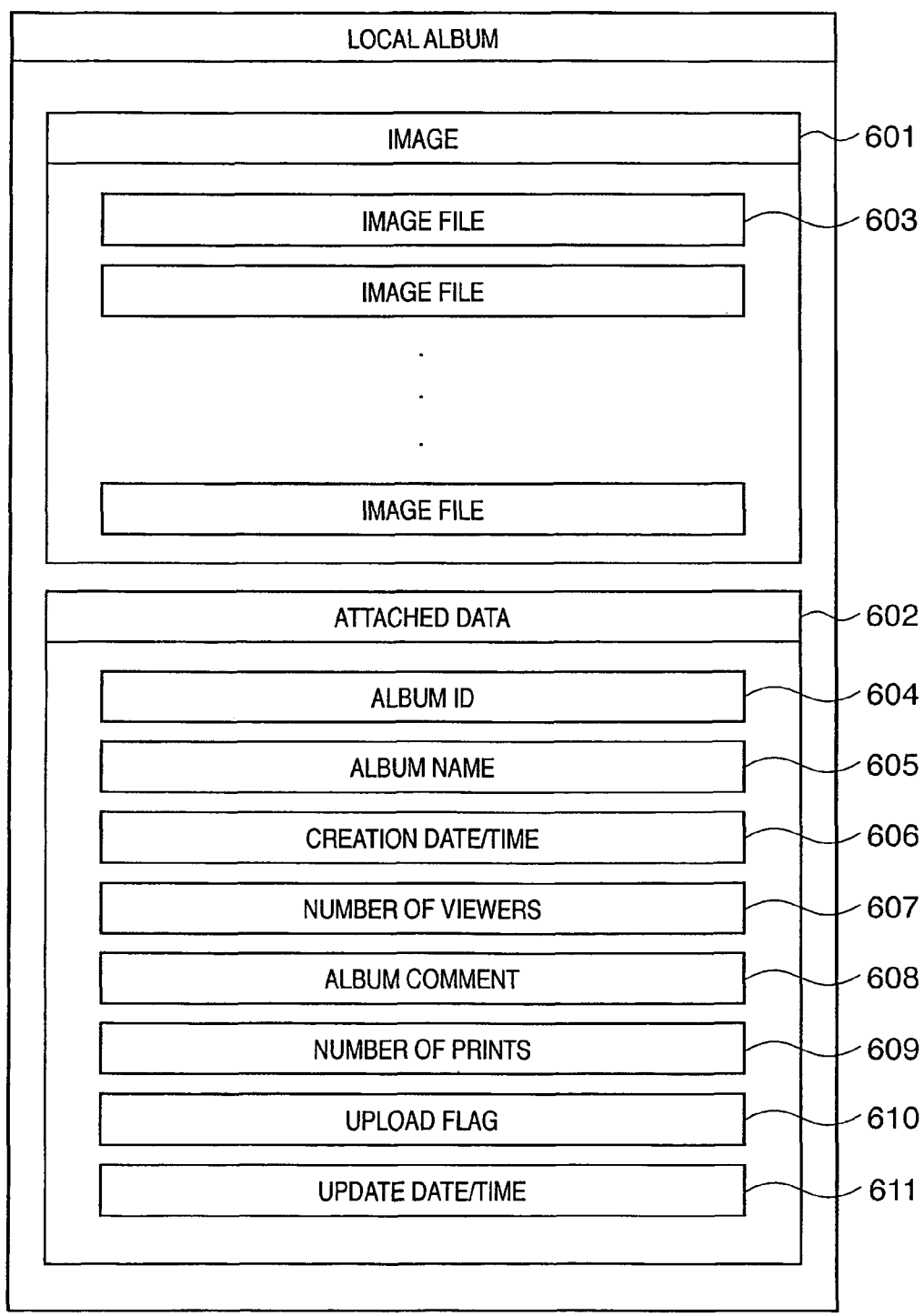
FIG. 6 is a view showing the data structure of a local album.

The data structure of a local album will be described. FIG. 6 shows the data structure of a local album. The local album contains an image 601 and attached data 602.

The local album has image files 603 belonging to it. In this embodiment, the album incorporates the image files themselves. Instead, the album may have an image link, and another storage area indicated by the link may save the image files themselves.

An album ID 604 is identification information uniquely given to the local album.

Reference numeral 605 denotes a name of the local album.

Reference numeral 606 denotes a creation date/time of the local album.

Reference numeral 607 denotes the number of viewers of a Web album corresponding to the local album. This will be described later in detail.

An-album comment 608 is text data representing a comment about the Web album corresponding to the local album. This will be described later in detail.

The number 609 of prints indicates the number of prints of an image in the Web album corresponding to the local album. This will be described later in detail.

An upload flag 610 has ON and OFF modes. The upload flag 610 in the ON state indicates the existence of a corresponding Web album in the server 104.

Browsing an image in the local album will be described next. The user double-clicks on the cover 408 of a local album by using the input device 309 to display, on the display 310, a local album image window that displays images in the local album.

Figure 7:
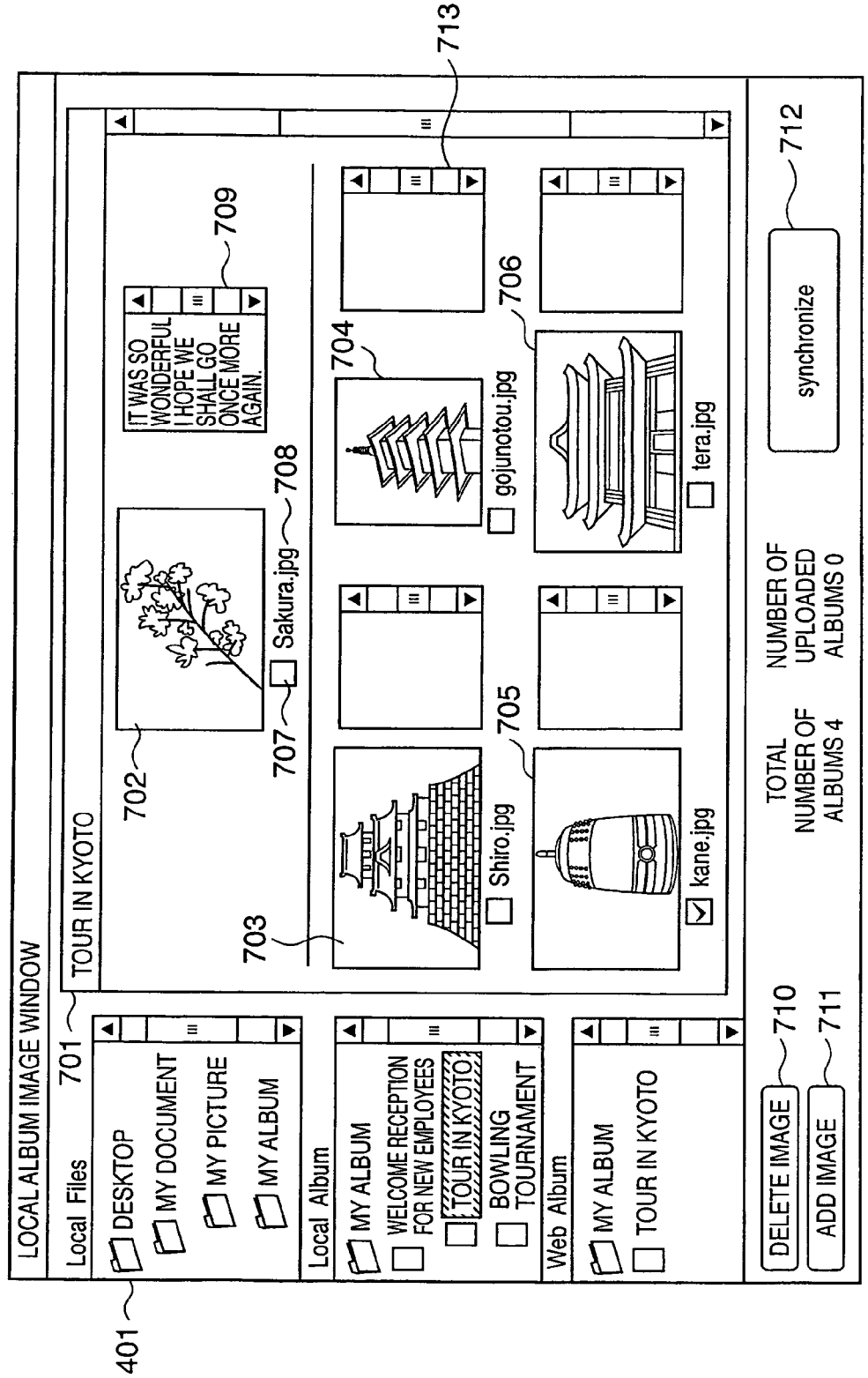
FIG. 7 is a view showing a local album image window.

FIG. 7 shows the local album image window.

A local image window 701 displays the list of images in the local album.

The local image window 701 displays a cover image 702 on the upper side. Remaining images in the album are displayed as indicated by 703 to 706.

The user double-clicks on one of the images 702 to 706 by using the input device 309 to display a high-resolution image corresponding to the double-clicked low-resolution image.

The user uses a check box 707 to select an image. Reference numeral 708 denotes an image file name.

The user inputs a comment about the album to an album comment field 709.

The user inputs a comment about an image to an image comment field 713.

The user uses an image deletion button 710 to delete an image from the local album. The user checks the check box 707 of an image to be deleted and clicks on the image deletion button 710 to delete the image from the local album.

The user uses an image addition button 711 to add an image from a local file. The user selects, from the local file display portion 401, an image to be added to the local album and clicks on the image addition button 711 to add the image to the local album.

In this way, the user can freely add/delete an image to/from the local album.

The user uses a synchronize button 712 for synchronization processing (to be described later).

Figure 8:
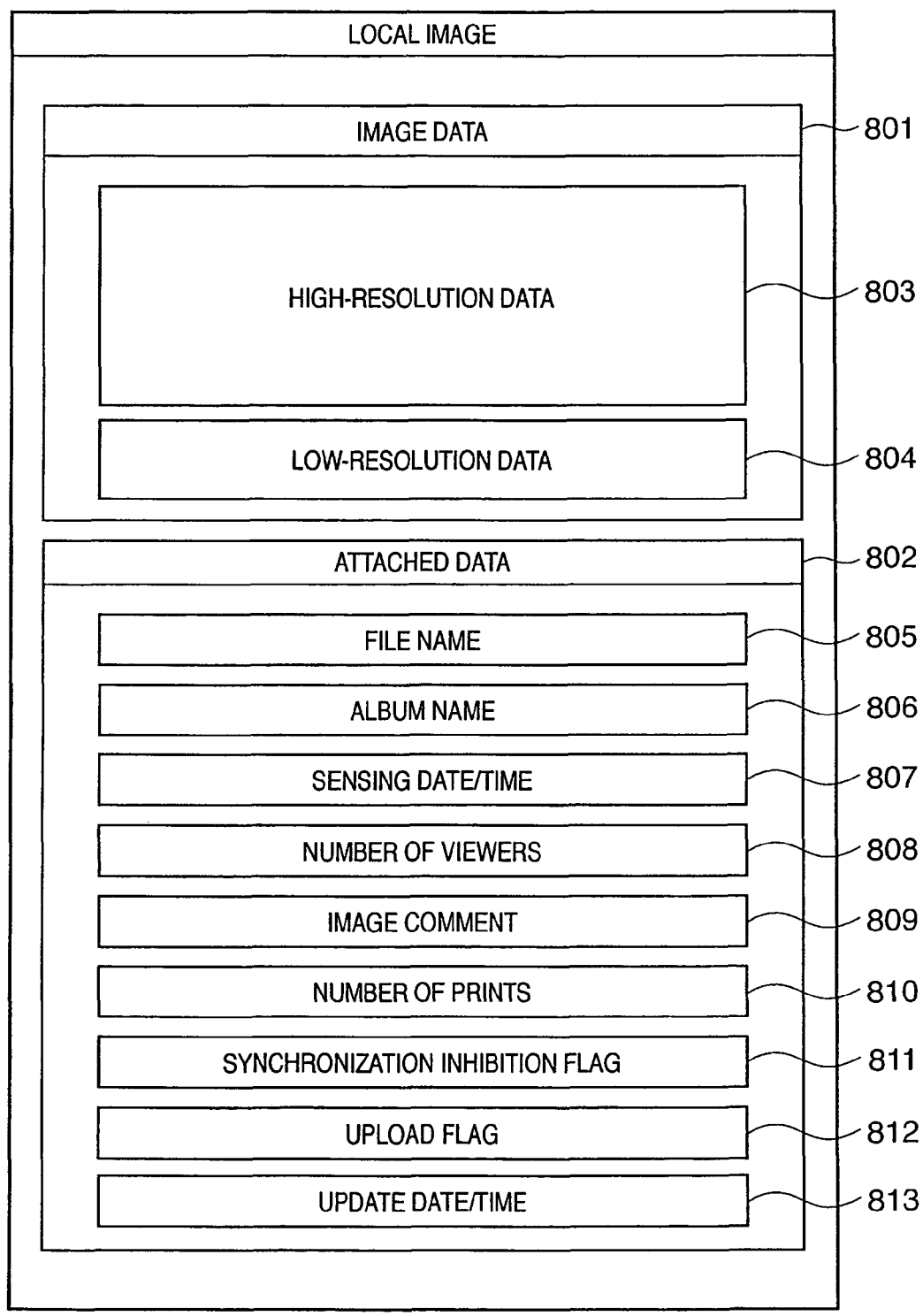
FIG. 8 is a view showing the data structure of an image file in the local album.

FIG. 8 shows the data structure of the image file 603 in the local album. The image contains image data 801 and attached data 802.

The image data contains high-resolution data 803 to be used for, e.g., printing and low-resolution data 804 to be used for, e.g., display.

Reference numeral 805 denotes an image file name.

Reference numeral 806 denotes a name 806 of an album to which the image belongs.

Reference numeral 807 denotes an image sensing date/time.

Reference numeral 808 denotes the number of viewers of the image in a corresponding Web album.

An image comment 809 is text data representing a comment about the image in the corresponding Web album.

The number 810 of prints indicates the number of prints of the image in the corresponding Web album.

An upload flag 812 has ON and OFF modes. The upload flag 812 in the ON state indicates the existence of a corresponding image in the server 104.

A synchronization inhibition flag 811 has ON and OFF modes. The synchronization inhibition flag 811 in the OFF state inhibits synchronization processing (to be described later) even if an instruction is received.

Album upload processing will be described next with reference to the procedure shown in FIG. 9.

Figure 9:
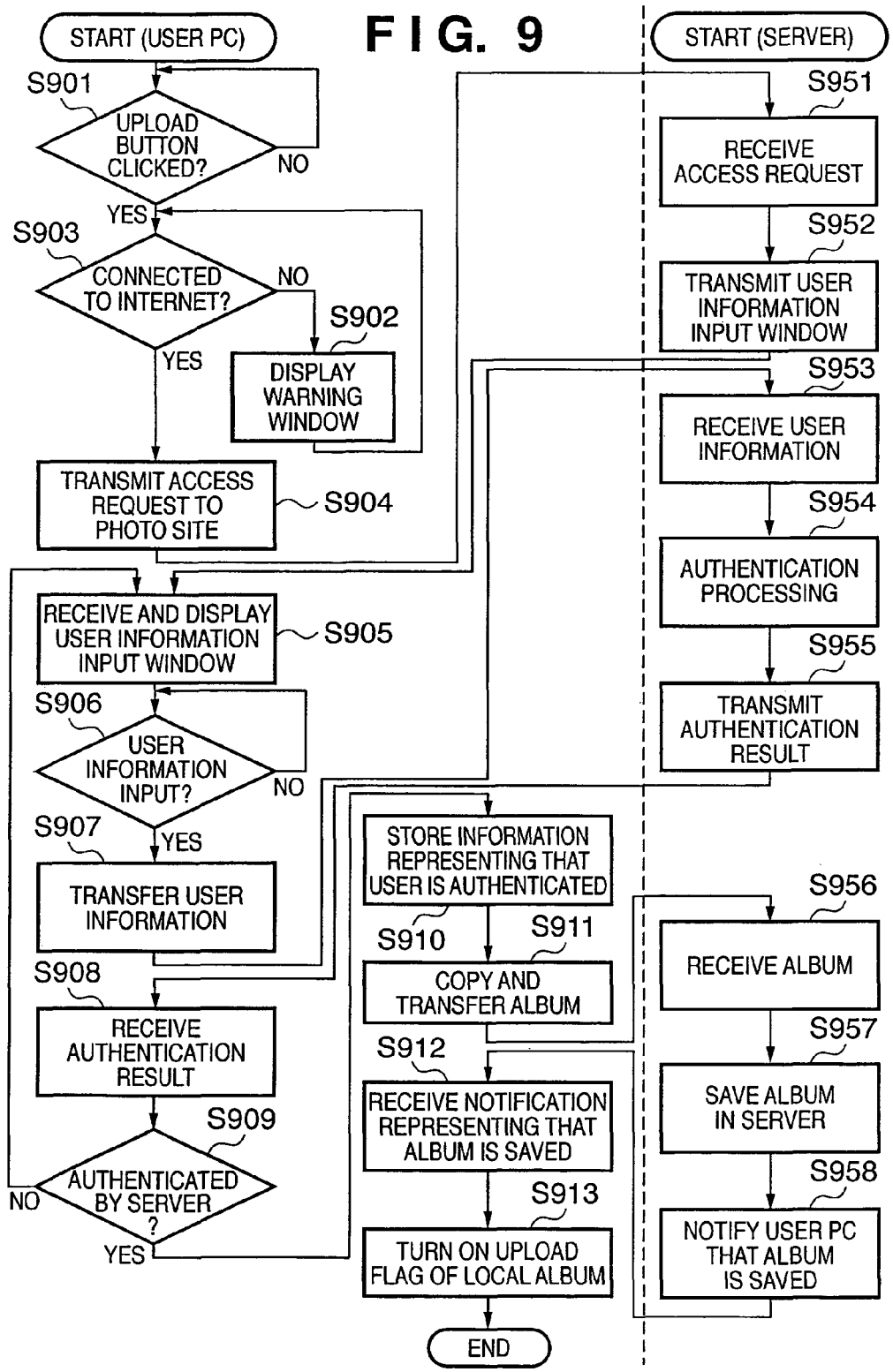
FIG. 9 is a flowchart showing the procedure of album upload processing.

The left side of the dotted line in FIG. 9 shows processing executed by the CPU 301 of the user PC 101 in accordance with a program installed in the external storage device 304 accessible from the user PC 101.

The right side of the dotted line in FIG. 9 shows processing executed by the CPU 201 of the server 104 in accordance with a program installed in the external storage device 204 accessible from the server 104.

In step S901, the CPU 301 of the user PC 101 determines whether the user has clicked on the upload button 413 in FIG. 4. At this time, an album to be uploaded is already selected.

If YES in step S901, the processing advances to step S903. If NO in step S901, the CPU 301 repeats the processing in step S901.

In step S903, the CPU 301 checks the state of the network IF 307 and determines whether the user PC 101 is connecting to the Internet 103. If NO in step S903, the display 310 displays a warning (step S902) to prompt the user to connect the PC to the Internet. If YES in step S903, the processing advances to step S904.

In step S904, the CPU 301 reads out a my album URL 612 from the external storage device 304 and accesses the photo site 105 through the network IF 307.

In step S951, the CPU 201 of the server 104 in the photo site 105 confirms reception of an access request from the user PC 101 through the network IF 205.

In step S952, the CPU 201 reads out, from the external storage device 204, a user authentication window to authenticate the user, activates the window, and transmits it to the user PC 101.

In step S905, the CPU 301 of the user PC confirms reception of the user authentication window through the network IF 307. The CPU 301 reads out a Web browser from the external storage device 304 and displays the user authentication window on the display 310 through the Web browser.

Figure 10:
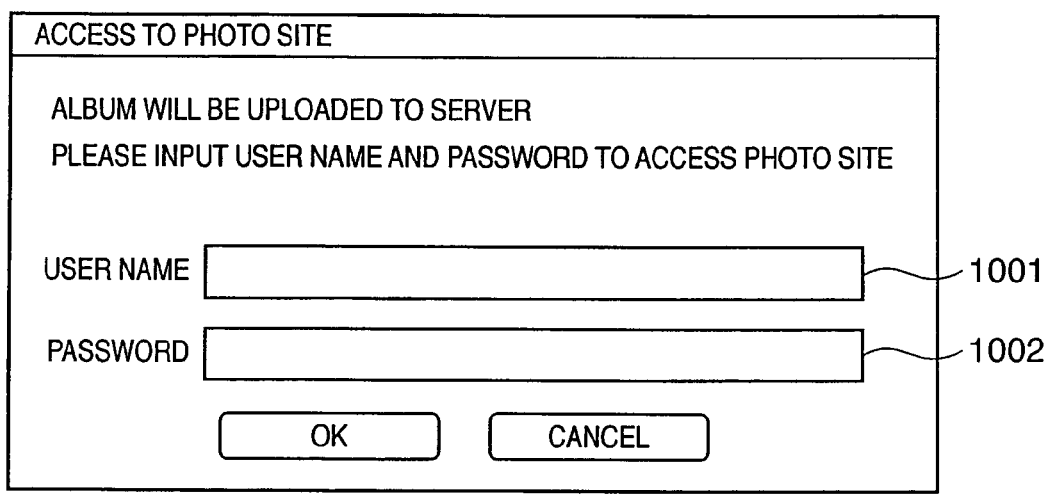
FIG. 10 is a view showing a user authentication window.

FIG. 10 shows the user authentication window. The user inputs, as user information, a user name and password to boxes 1001 and 1002 by using the input device 309 and clicks on the OK button. The CPU 301 determines upon clicking on the OK button that the pieces of user information are input (YES in step S906). The processing advances to step S907. If the CPU 301 determines that no user information is input (NO in step S906), the processing returns.

In step S907, the CPU 301 transmits, to the server 104, the user information input in step S906.

The CPU 201 of the server 104 confirms reception of the transmitted user information in step S953 and starts authentication processing in step S954.

In step S954, the CPU 201 reads out the IDs of registered users from the external storage device 204 of the authentication processing server 104. The CPU 201 searches for an ID identical to the ID contained in the received user information and reads out a corresponding password. The CPU 201 collates the received password with the readout password and, if the passwords coincide with each other, determines the user as an authentic user and permits him/her to use the photo site 105. If the passwords do not coincide, the CPU 201 does not permit use of the photo site 105.

In step S955, the CPU 201 transmits the authentication result to the user PC 101. If the user is authenticated in step S954, the CPU 201 transmits a message as such. If the user is not authenticated, the CPU 201 transmits a message as such.

In step S908, the CPU 301 of the user PC 101 confirms reception of the authentication result from the server 104.

In step S909, the CPU 301 determines whether the server 104 has authenticated the user. If YES in step S909, the processing advances to step S910. If NO in step S909, the processing returns to step S905 to request the user to input user information again.

In step S910, the CPU 301 stores, in the RAM 303, information representing that the server 104 has authenticated the user. This information is erased when the image editing application has finished.

In step S911, the CPU 301 copies the selected local album and transmits the copied album to the server 104. At this time, the CPU 301 reads out the my album URL from the external storage device 304 and transmits it together with the copied album. The attached data 602 of the local album may contain the my album URL.

In step S956, the CPU 201 of the server 104 confirms reception of the album transmitted from the user PC 101.

In step S957, the CPU 201 stores the received album as a Web album in an area indicated by the received my album URL. Physically, the Web album is saved in the user area of the external storage device 204 of the server.

In step S958, the CPU 201 transmits, to the user PC 101, information representing that the Web album is saved.

Upon confirming reception of the information representing that the Web album is saved (step S912), the CPU 301 of the user PC 101 turns on the upload flag 610 of the local album of the copy source. The CPU 301 also turns on the upload flag 812 of each image in the local album of the copy source (step S913).

Figure 11:
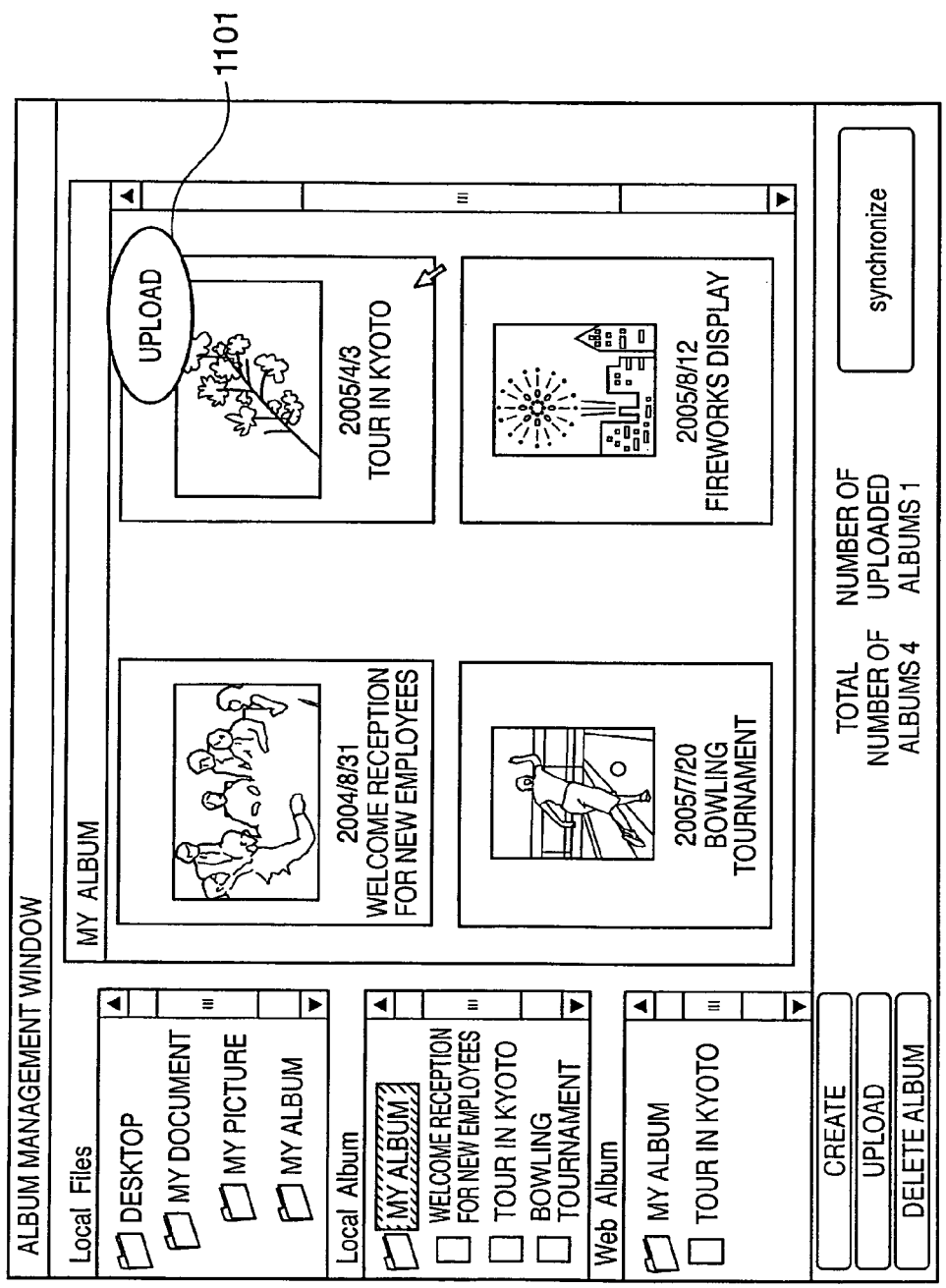
FIG. 11 is a view showing the album management window of an image editing application.
Figure 12:
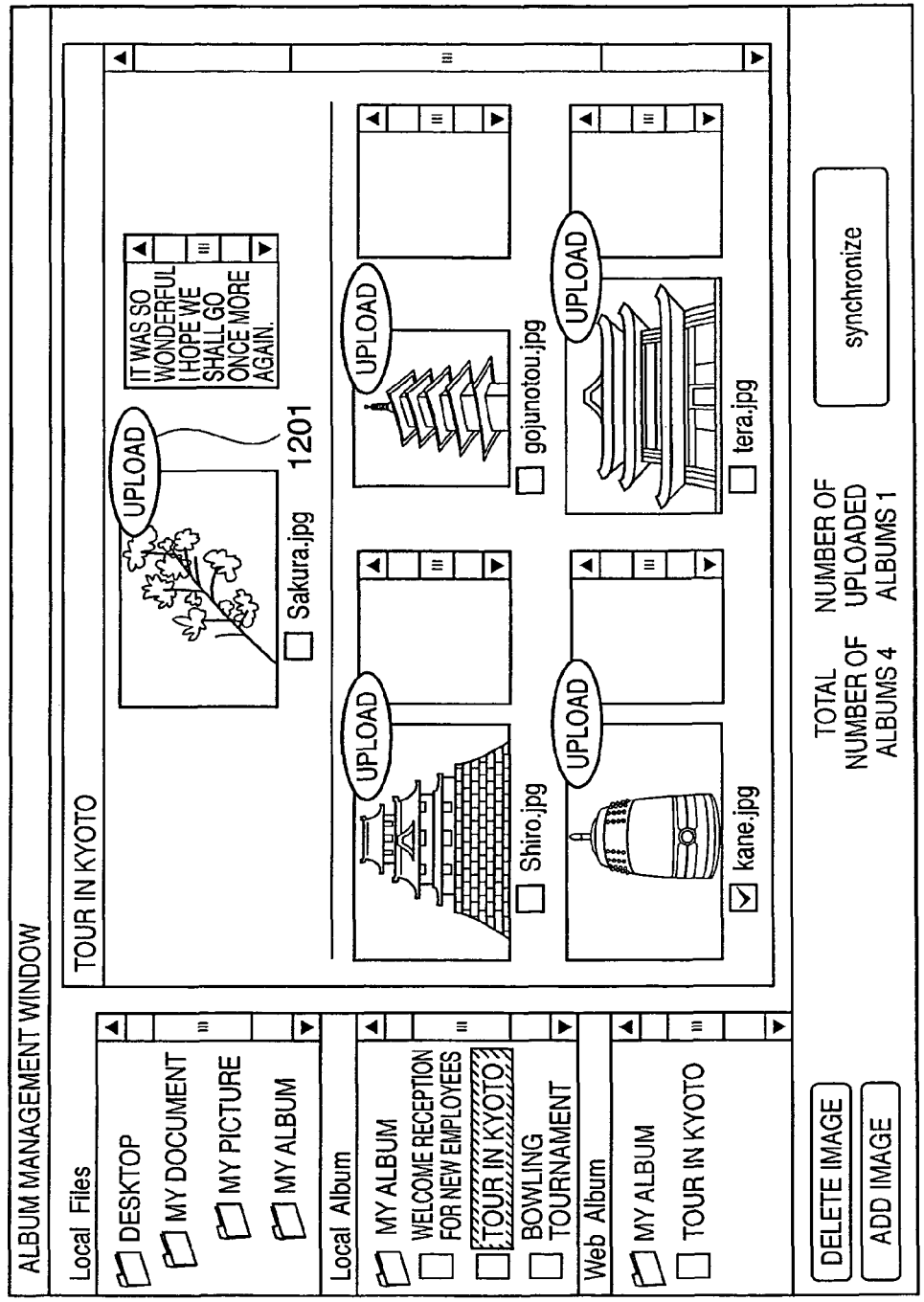
FIG. 12 is a view showing a local album image window.

If the upload flag of the local album is ON, an upload icon 1101 is displayed near the local album, as shown in FIG. 11. An upload icon 1201 is also displayed near each image in the local album, as shown in FIG. 12.

If the local album does not have the image file 603 itself but only a link, not only the copied album but also linked images are transmitted to the server 104.

Figure 13:
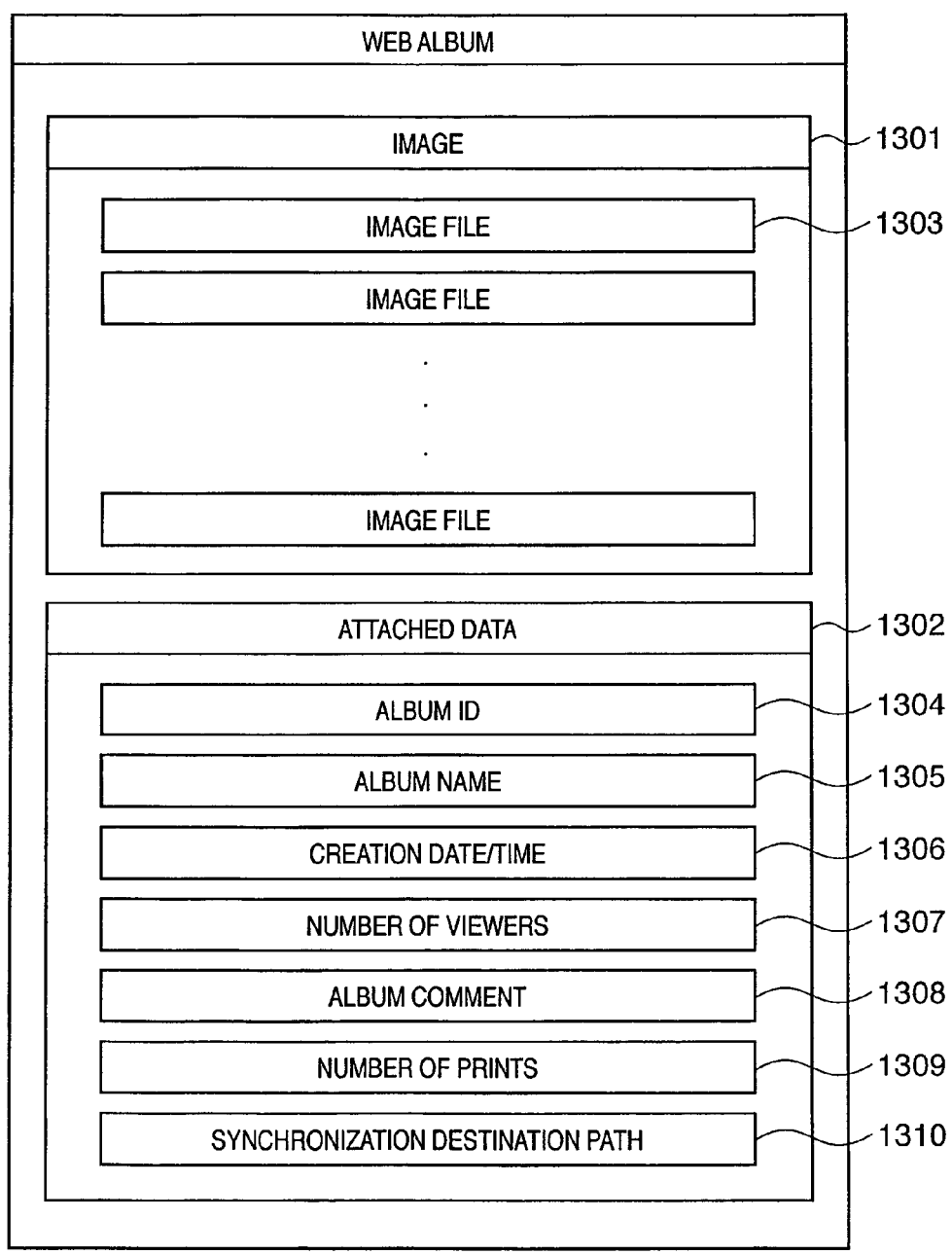
FIG. 13 is a view showing the data structure of a Web album.

The album uploaded to the server 104, i.e., the Web album has a data structure shown in FIG. 13. This data structure is almost the same as that of the local album except that the upload flag 610 in FIG. 6 is omitted, and a synchronization destination path 1310 is added. The synchronization destination path 1310 indicates the path of the local album of the synchronization destination in synchronization with the local album.

Change from the local album data structure shown in FIG. 6 to the Web album data structure shown in FIG. 13 may be done either in the user PC 101 in copying the local album or in the server 104 after upload. This applies not only to the album but also to images in the Web album (to be described later). This also applies to image download from the server 104 to the user PC 101.

Figure 14:
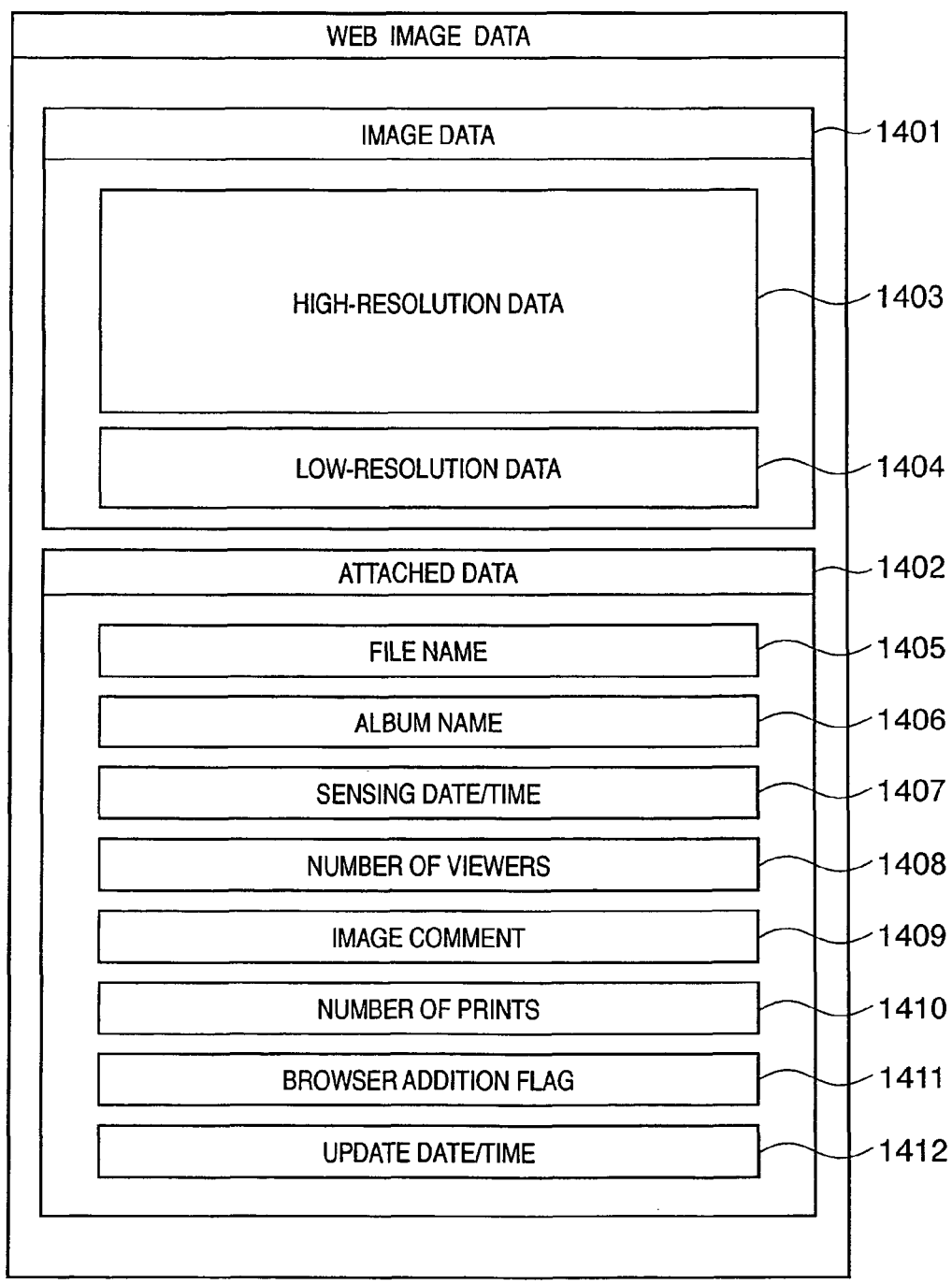
FIG. 14 is a view showing the data structure of an image in the Web album.

An image 1303 in the Web album has a data structure shown in FIG. 14. This data structure is almost the same as that of an image in the local album except that the synchronization inhibition flag 811 and upload flag 812 in FIG. 8 are omitted, and a browser addition flag 1411 is added. The browser addition flag 1411 has ON and OFF modes. The browser addition flag 1411 in an image uploaded in accordance with the procedure in FIG. 9 turns off. The browser addition flag 1411 of an image directly added to the Web album through the Web browser turns on. The processing of directly adding an image to the Web album through the Web browser will be described later.

To browse the Web album, the user boots up the Web browser in the user PC 101 and sends a browsing request to the server 104 on the basis of the my album URL 502. Upon receiving the browsing request, the CPU 201 of the server 104 reads out the data of a Web album browsing window from the external storage device 204 and transmits it to the user PC 101. The CPU 301 displays the received data of the Web album browsing window on the display 310 through the Web browser.

Display of the Web album is done on the Web browser. Hence, the user can browse the Web album without activating the above-described image editing application.

Figure 15:
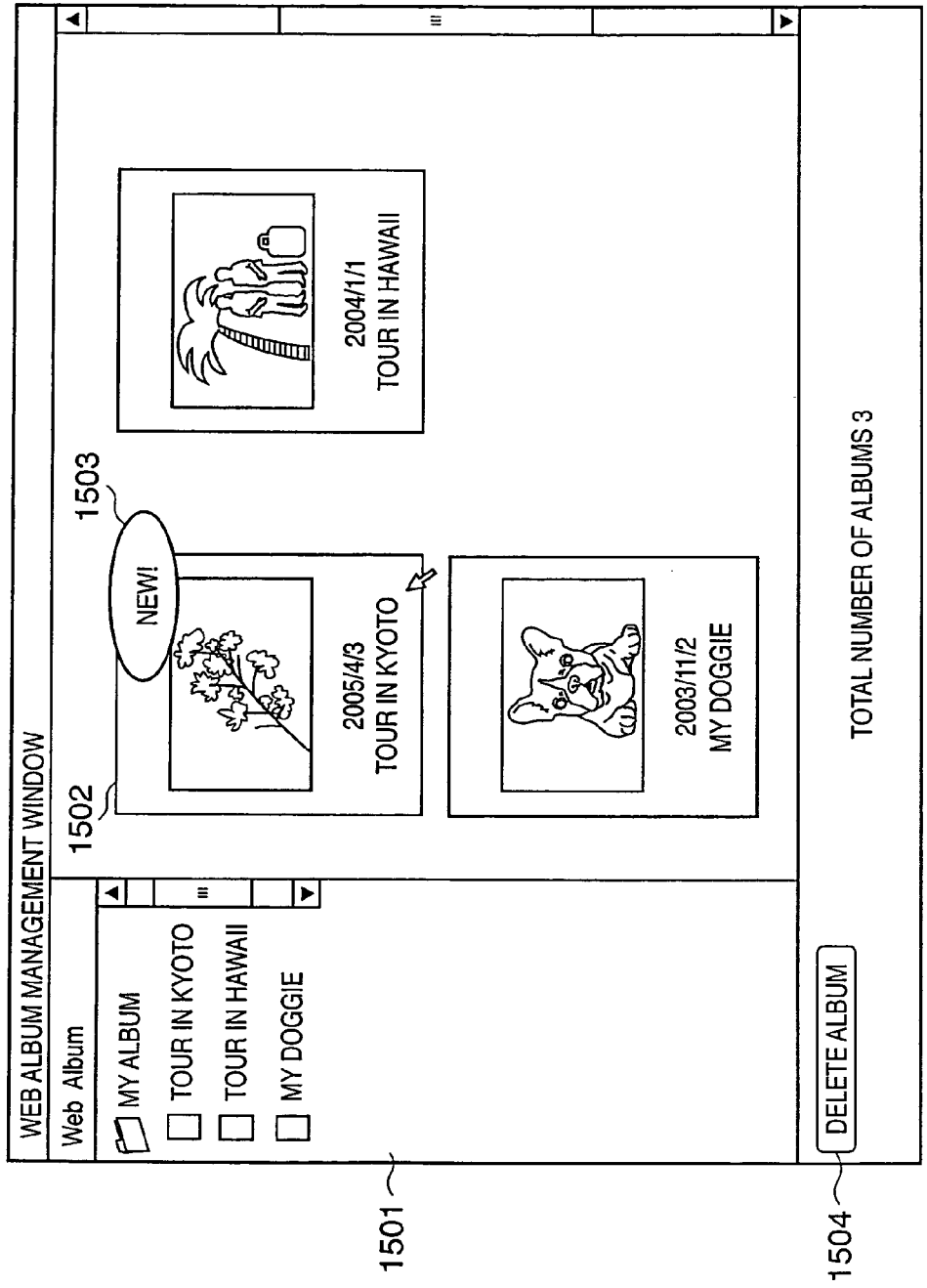
FIG. 15 is a view showing an album browsing window.

FIG. 15 shows the Web album browsing window. A Web album display portion 1501 displays currently uploaded albums.

Reference numeral 1502 denotes a cover of an uploaded Web album.

A new upload icon 1503 is displayed near an album that the user does not browse yet since upload.

The user uses an album deletion button 1504 to delete an album from the server 104.

Figure 16:
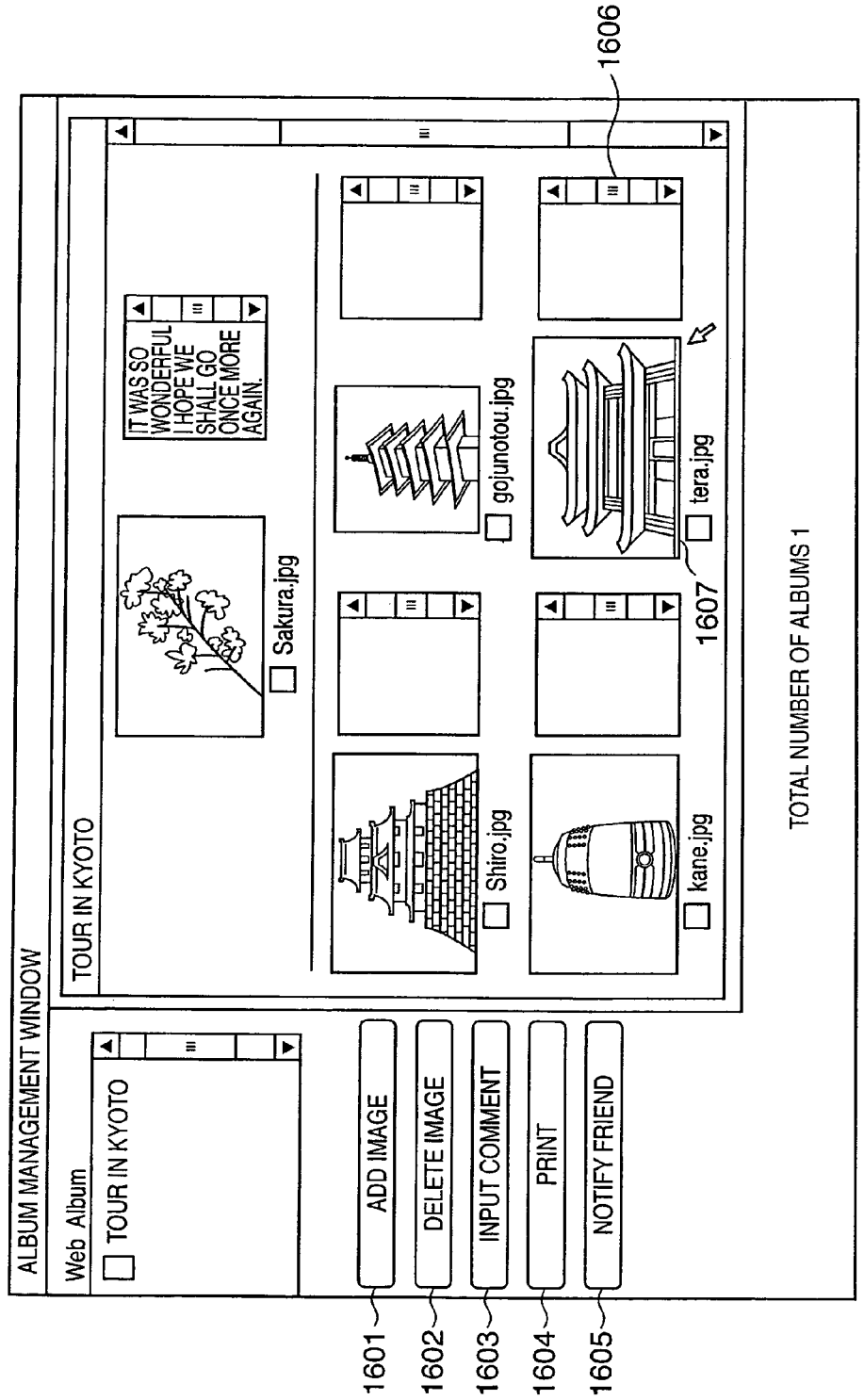
FIG. 16 is a view showing a Web album image browsing window.

The user double-clicks on the cover 1502 of a Web album by using the input device 309 to display images in the Web album. FIG. 16 shows a Web album image browsing window.

A description of the same parts as in the album image browsing window shown in FIG. 7 will be omitted.

The user double-clicks on an image 1607 by using the input device 309 to display a high-resolution image.

The user sues an image addition button 1601 to add an image to the Web album. This processing will be described later.

Figure 17:
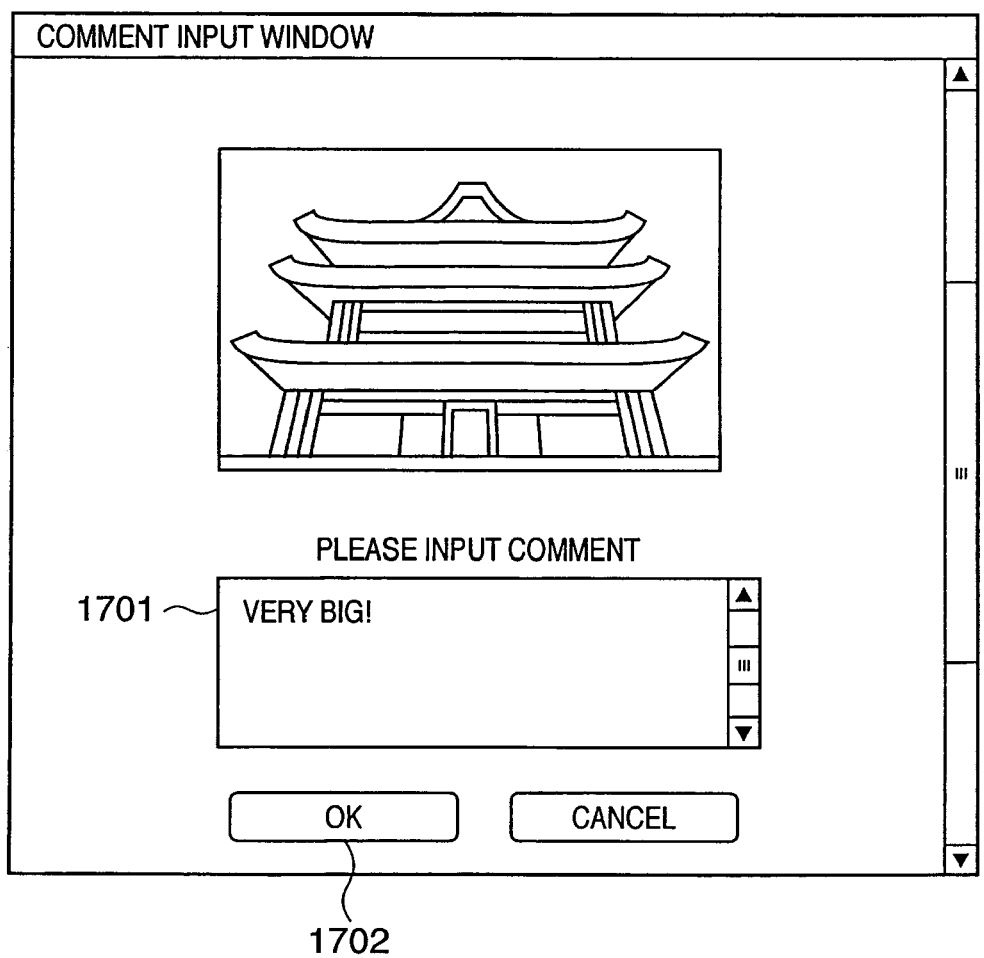
FIG. 17 is a view showing a user comment input window.

Reference numeral 1603 denotes a comment input button. The user clicks on the comment input button 1603 to display a window shown in FIG. 17. The user inputs a comment to a comment input field 1701 and clicks on an OK button 1702 to input the comment to a comment field 1606 in FIG. 16.

Reference numeral 1604 denotes a print button. The user selects an image and clicks on the print button 1604 to transmit the selected image from the server 104 to the user PC 101. The image is transferred from the user PC 101 to a printer (not shown) connected to the user PC 101 and printed.

Reference numeral 1605 denotes a friend notification button. The user clicks on the friend notification button 1605 to automatically create e-mail containing the my album URL. The user inputs the mail address of, e.g., a friend who should see the Web album and transmits the e-mail. The friend who has received the e-mail can access the server 104 by using a Web browser and browse the Web album on the basis of the my album URL contained in the e-mail.

The friend can also execute the above-described comment input and image print. The number 1307 of viewers, album comment 1308, and the number 1309 of prints in FIG. 13 are updated in accordance with access or operation of the friend. Upon detecting change from the window shown in FIG. 15 to the window shown in FIG. 16, the CPU 201 increments the number 1307 of viewers by one.

In addition, the number 1408 of viewers, image comment 1409, and the number 1410 of prints shown in FIG. 14 are updated for each browsed image. Upon detecting enlarged display of the image 1607, the CPU 201 increments the number 1408 of viewers by one.

Figure 18:
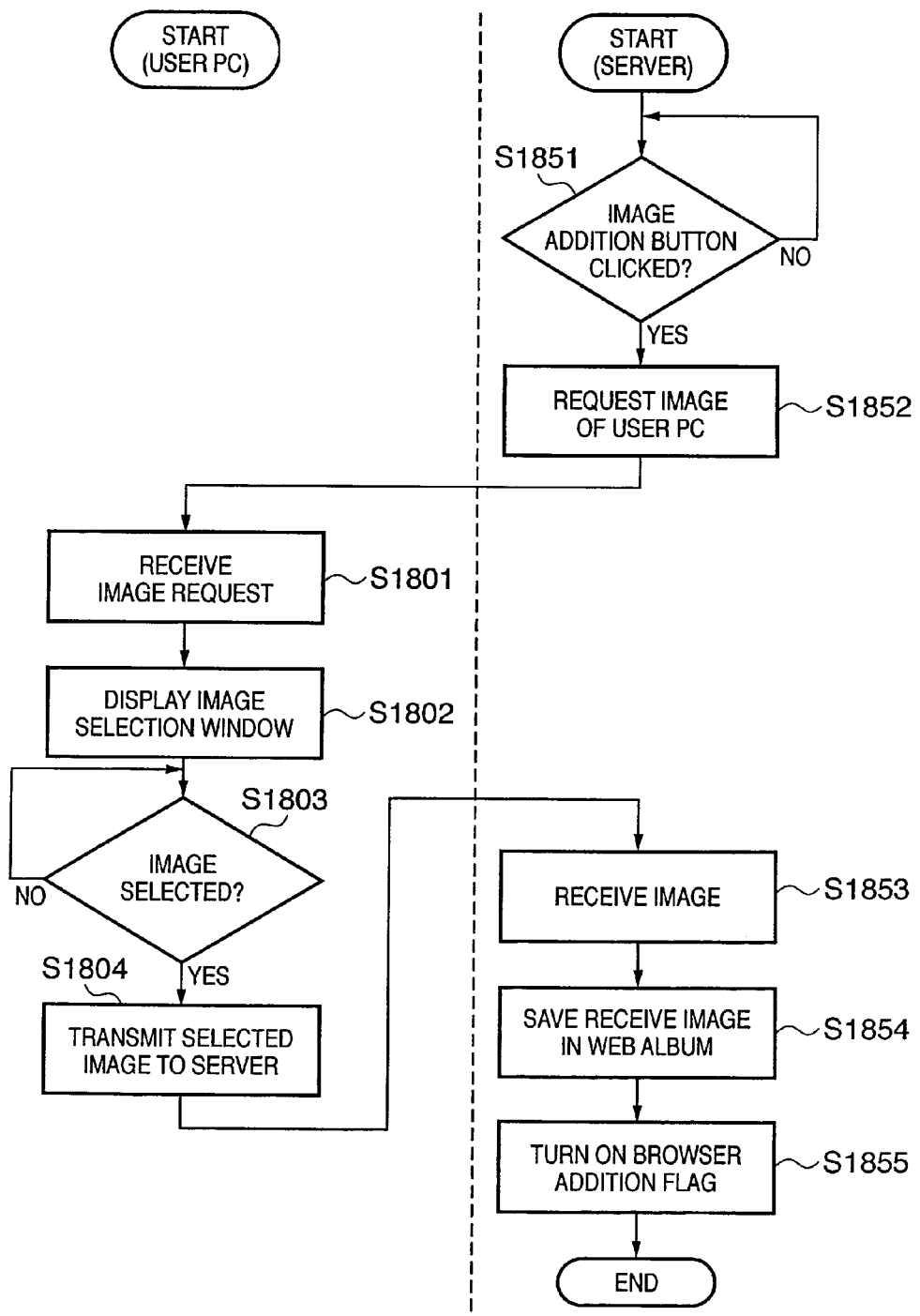
FIG. 18 is a flowchart showing the procedure of processing of adding an image to the Web album.

Processing of directly adding a new image to the Web album by using the image addition button 1601 will be described. FIG. 18 shows the procedure of processing of adding an image.

The left side of the dotted line in FIG. 18 shows processing executed by the CPU 301 of the user PC 101 in accordance with a program installed in the external storage device 304 accessible from the user PC 101.

The right side of the dotted line in FIG. 18 shows processing executed by the CPU 201 of the server 104 in accordance with a program installed in the external storage device 204 accessible from the server 104.

If the CPU 201 of the server 104 determines in step S1851 that the user has clicked on the image addition button 1601 the processing advances to step S1852. If NO in step S1851, the CPU 201 repeats the processing in step S1851.

In step S1852, the CPU 201 transmits, to the user PC 101, information to request an image to be added to the Web album.

In step S1801, the CPU 301 of the user PC 101 confirms reception of the information transmitted in step S1852.

In step S1802, the CPU 301 reads out images saved in the external storage device 304 of the user PC 101 or the digital camera 102 and displays an image selection window (not shown) on the display 310.

The user selects an image to be added to the Web album by using the input device 309. If the CPU 301 determines in step S1803 that the user has selected an image, the processing advances to step S1804. If NO in step S1803, the CPU 301 repeats the processing in step S1803.

In step S1804, the CPU 301 transmits the image selected by the user to the server 104.

In step S1853, the CPU 201 of the server 104 confirms reception of the image transmitted from the user PC 101 through the network IF 205.

In step S1854, the CPU 201 saves the received image in the external storage device 204 of the server 104 as an image in the Web album.

In step S1855, the CPU 201 turns on the browser addition flag 1411 of the image saved in the Web album. This processing enables to determine whether the image in the Web album is copied from the local album or directly added to the Web album by an operation on the Web browser window.

Various kinds of operations for the Web album are done by user instructions from the window shown in FIG. 16. Hence, it is possible to execute operations such as addition and deletion of an image independently of the state of the local album of the copy source. This sometimes produces mismatch between images in the local album as the copy source and those in the Web album as the copy destination. To solve this problem, synchronization processing is necessary.

Figure 19:
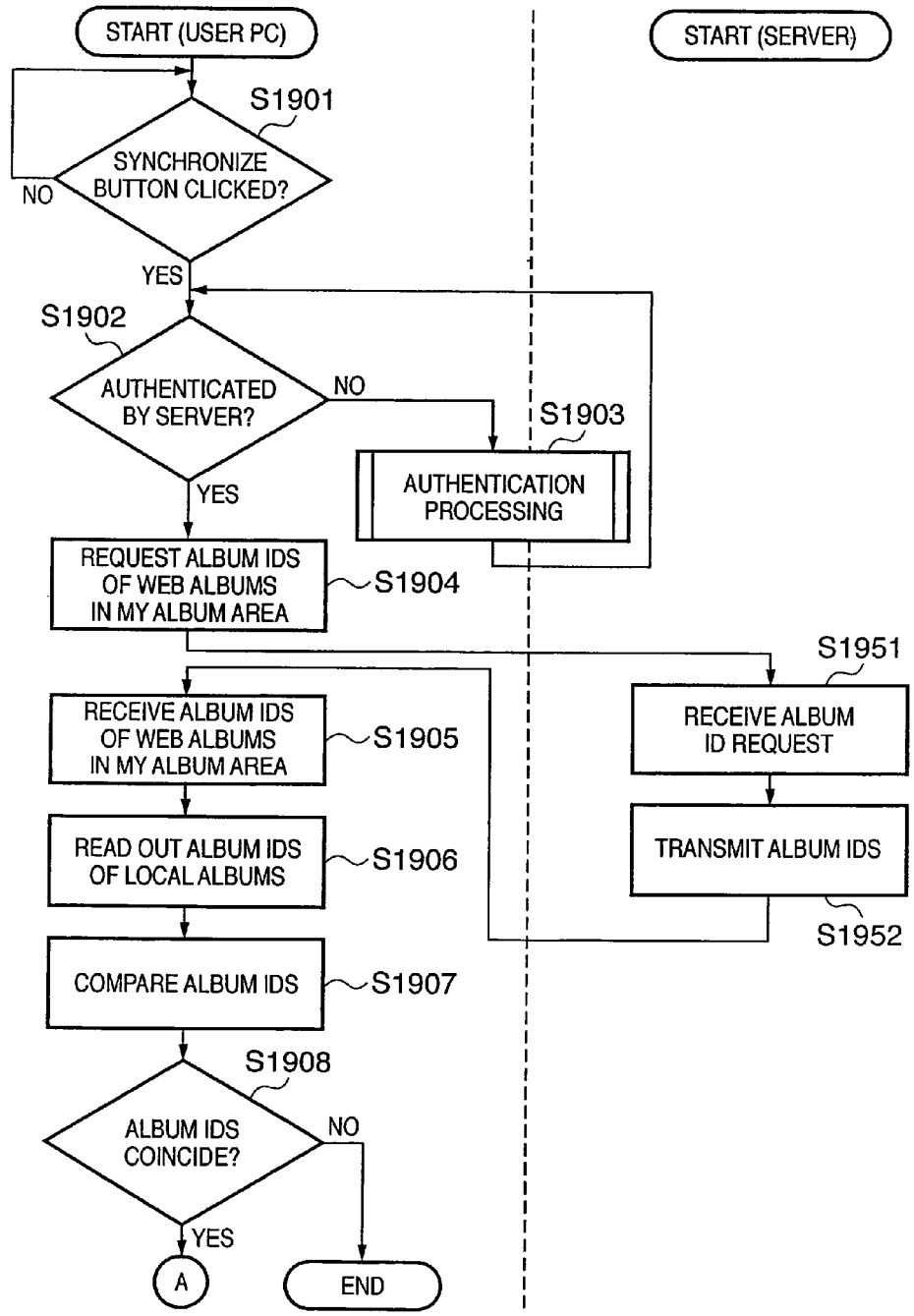
FIG. 19 is a flowchart showing the procedure of synchronization processing of the local album and Web album.
Figure 24:
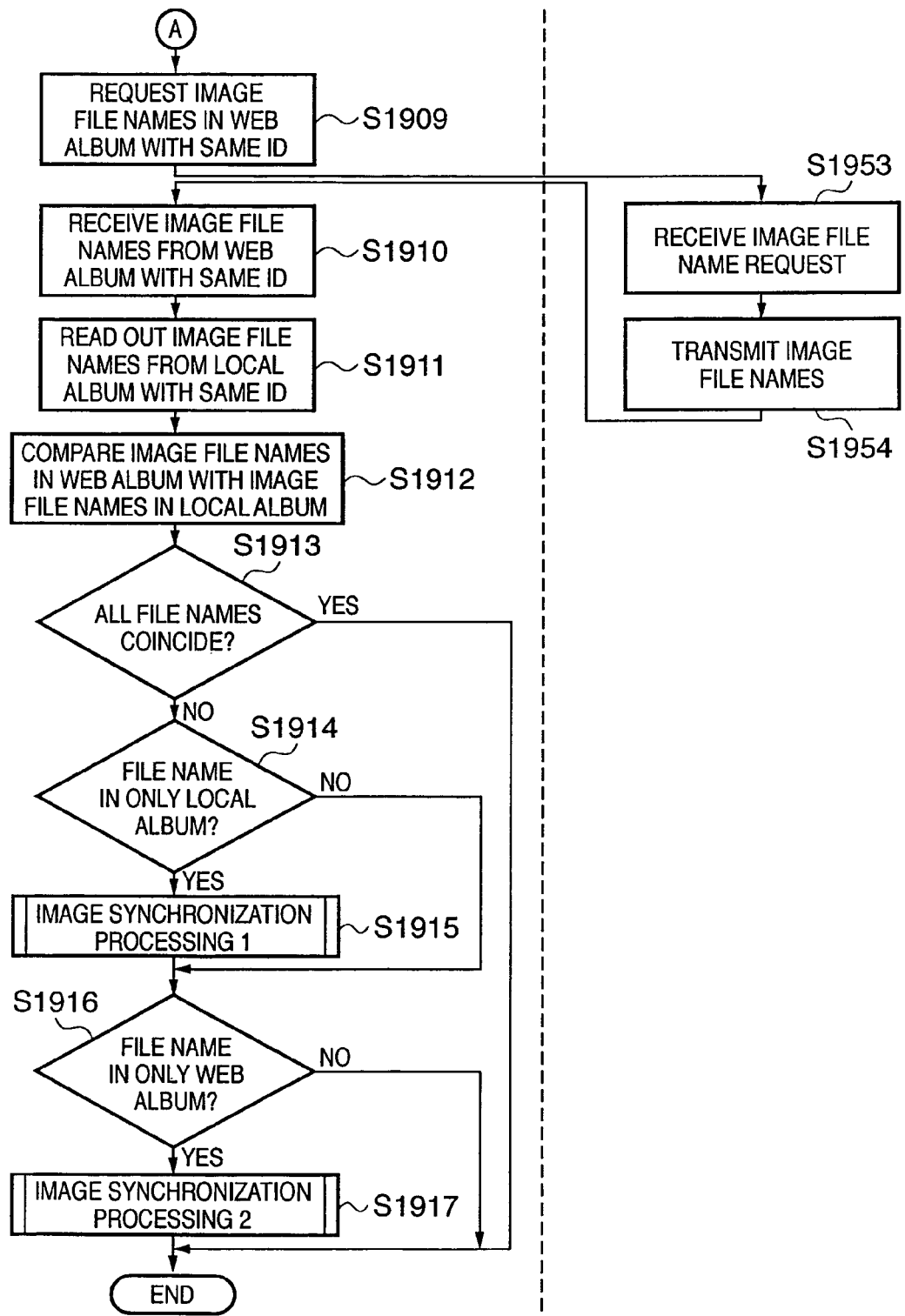
FIG. 24 is a flowchart showing the procedure of synchronization processing of a local album and Web album.

Synchronization processing of the local album and Web album will be described below. FIGS. 19 and 24 show the procedure of synchronization processing.

The left side of the dotted line in each of FIGS. 19 and 24 shows processing executed by the CPU 301 of the user PC 101 in accordance with a program installed in the external storage device 304 accessible from the user PC 101.

The right side of the dotted line in each of FIGS. 19 and 24 shows processing executed by the CPU 201 of the server 104 in accordance with a program installed in the external storage device 204 accessible from the server 104.

If the CPU 301 of the user PC 101 determines in step S1901 in FIG. 19 that the user has clicked on the synchronize button 416, the processing advances to step S1902. If NO in step S1901, the CPU 301 repeats the processing in step S1901.

In step S1902, the CPU 301 determines whether the RAM 303 stores information representing that the server 104 has authenticated the user. If YES in step S1902, the CPU 301 determines that authentication has already been done. The processing advances to step S1904. If NO in step S1902, the CPU 301 determines that authentication has not been done yet. The processing advances to step S1903.

In step S1903, the user PC 101 and server 104 execute the user authentication processing in steps S905 to S907 in FIG. 9.

In step S1904, the CPU 301 requests the server 104 to transmit album IDs 1304 of albums in the my album area of the external storage device 204 of the server 104.

In step S1951, the CPU 201 of the server 104 confirms reception of the album ID transmission request transmitted from the user PC 101.

In step S1952, the CPU 201 reads out the album IDs 1304 of albums in the my album area from the external storage device 204 and transmits them to the user PC 101.

In step S1905, the CPU 301 of the user PC 101 confirms reception of the album IDs 1304 of the albums in the my album area of the external storage device 204 of the server 104 and stores the received album IDs 1304 in the RAM 303.

In step S1906, the CPU 301 reads out the album IDs 604 of local albums saved in the external storage device 304 of the user PC 101 and stores them in the RAM 303.

In step S1907, the CPU 301 compares the album IDs 1304 of the Web albums, which are stored in the RAM 303 in step S1905, with the album IDs 604 of the local albums, which are stored in the RAM 303 in step S1906.

In step S1908, the CPU 301 determines whether there are album IDs coincident with each other as a result of comparison in step S1907. If YES in step S1908, the processing advances to step S1909. FIG. 24 shows processing from step S1909. If NO in step S1908, the synchronization processing is complete.

Processing from step S1909 will be described below. "Local album" and "Web album" in the description of the procedure (including sub-procedures) indicate albums that are determined in step S1908 to have identical album IDs, unless otherwise specified.

In step S1909, the CPU 301 of the user PC 101 requests the server 104 to transmit file names 1405 of images in a Web album saved in the external storage device 204 of the server 104.

In step S1953, the CPU 201 of the server 104 confirms reception of the image file name transmission request transmitted from the user PC 101.

In step S1954, the CPU 201 reads out the file names 1405 of images in the Web album in the my album area from the external storage device 204 and transmits them to the user PC 101.

In step S1910, the CPU 301 of the user PC 101 confirms reception of the image file names 1405 transmitted from the server 104 and stores them in the RAM 303.

In step S1911, the CPU 301 reads out the image file names 805 from a local album saved in the external storage device 304 and stores them in the RAM 303.

In step S1912, the CPU 301 compares the image file names in the Web albums, which are stored in the RAM 303, with the image file names in the local album.

If the CPU 301 determines in step S1913 that all the file names compared in step S1912 coincide, the synchronization processing is complete. In this case, the images in the local album coincide with those in the Web album, and no synchronization is necessary. If at least one file name that is not coincident is present, the processing advances to step S1914.

In step S1914, the CPU 301 determines whether there is a file name existing in only the local album. This processing is executed on the basis of the result in step S1912. If YES in step S1914, the processing advances to step S1915. If NO in step S1914, the processing advances to step S1916.

In step S1915, the CPU 301 executes image synchronization processing 1. This processing will be described later.

In step S1916, the CPU 301 determines whether there is a file name existing in only the Web album. This processing is also executed on the basis of the result in step S1912. If YES in step S1916, the processing advances to step S1917. If NO in step S1916, the synchronization processing is complete.

In step S1917, the CPU 301 executes image synchronization processing 2. This processing will be described later.

Image synchronization processing 1 in step S1915 will be described. Situations wherein the CPU 301 determines that there is a file name existing in only the local album are roughly classified into two cases. In the first case, the user has added a new image to the local album by operating the image addition button 711 in FIG. 7. In the second case, the user has deleted an image from the Web album as a copy of the local album by operating an image deletion button 1602 in FIG. 16.

Especially in the second case, simple synchronization processing causes a trouble. For example, assume that synchronization processing is executed to match the contents of the local album with those of the Web album. If the user wants to delete an image from only the Web album to withdraw it from the public view, the image is deleted even from the local album and lost. If synchronization processing is executed to match the contents of the Web album with those of the local album, an image deleted from the Web album and withdrawn from the public view is added to the Web album again.

To avoid these problems, this embodiment executes image synchronization processing in the following way.

Figure 20:
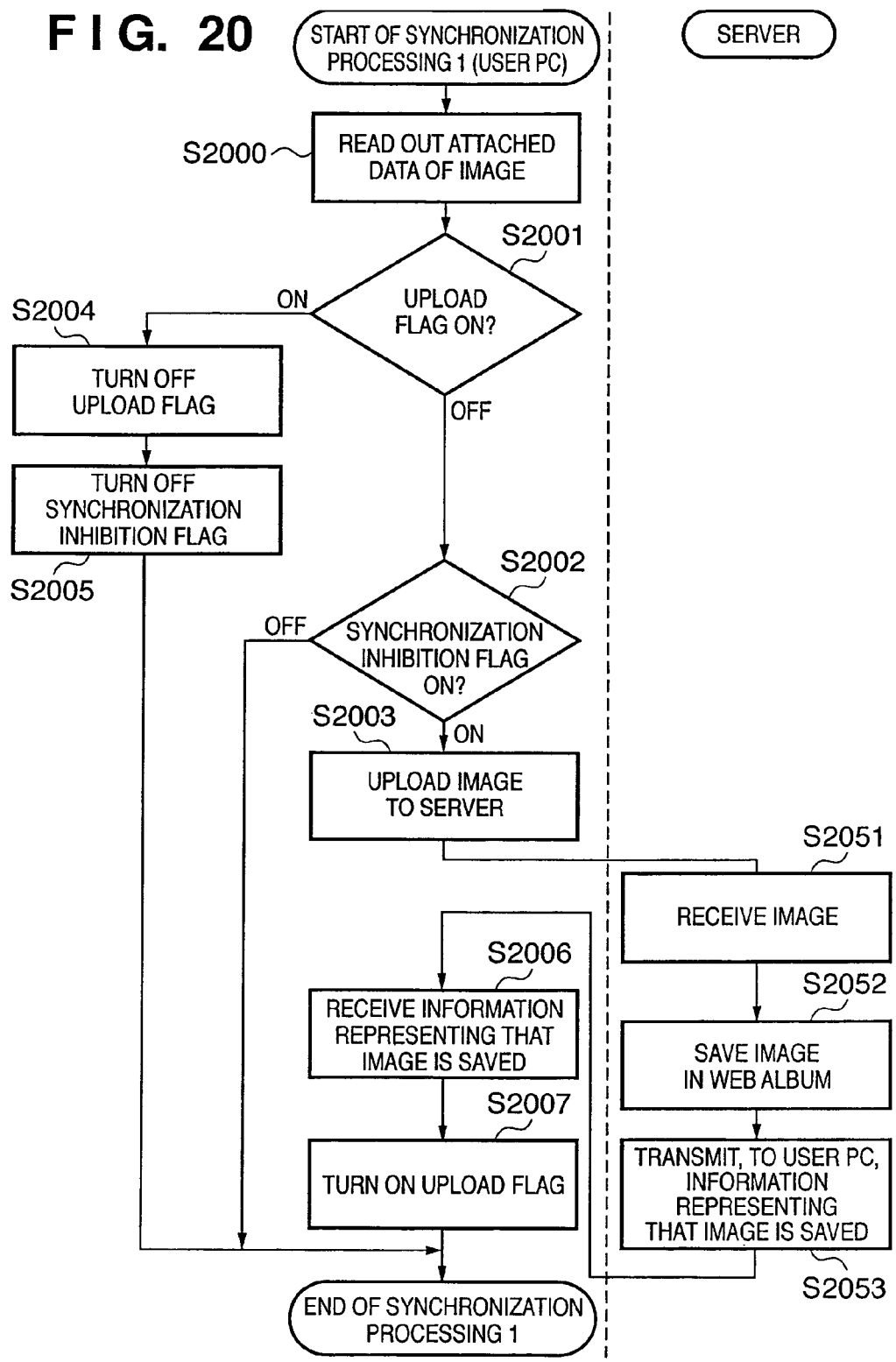
FIG. 20 is a flowchart showing the sub-procedure of image synchronization processing 1.

FIG. 20 shows the sub-procedure of image synchronization processing 1 in step S1915. This processing will be described below with reference to FIG. 20.

In step S2000, the CPU 301 of the user PC 101 reads out, from the external storage device 304, the attached data 802 of the image (to be referred to as a "local synchronous image" hereinafter) existing in only the local album on the basis of the file name stored in the RAM 303.

In step S2001, the CPU 301 determines whether the upload flag 812 of the local synchronous image is ON or OFF.

A case wherein the upload flag 812 is OFF will be described below. In this case, the CPU 301 determines that a new image is added to the local album. The processing advances to step S2002. The following procedure corresponds to processing of uploading a new image to the server 104.

In step S2002, the CPU 301 determines whether the synchronization inhibition flag 811 of the local synchronous image is ON or OFF. If the flag is ON, the processing advances to step S2003. If the flag is OFF, the processing is complete. This processing finishes the sub-procedure and returns to the procedure in FIG. 19.

In step S2003, the CPU 301 reads out the local synchronous image from the external storage device 304 and transmits a copy of the image to the server 104.

In step S2051, the CPU 201 of the server 104 confirms reception of the image transmitted from the user PC 101.

In step S2052, the CPU 201 saves the received image in the external storage device 204 of the server 104 as an image in the Web album.

In step S2053, the CPU 201 transmits, to the user PC 101, information representing that the Web album is saved.

In step S2006, the CPU 301 of the user PC 101 confirms reception, from the server 104, of the information representing that the Web album is saved.

In step S2007, the CPU 301 turns on the upload flag 812 of the image of the copy source. The processing returns to the procedure in FIG. 19.

A case wherein the CPU 301 determines in step S2001 that the upload flag 812 is ON will be described below. In this case, the CPU 301 determines that an image is deleted from the Web album. The processing advances to step S2004.

In step S2004, the CPU 301 of the user PC 101 reads out the local synchronous image from the external storage device 304 and turns off the upload flag 812.

In step S2005, the CPU 301 turns off the synchronization inhibition flag of the local synchronous image. The processing returns to the procedure in FIG. 19 without uploading an image.

This synchronization processing makes it possible to reflect the state of the Web album on the local album without losing the image from the local album. It also prevents the image deleted from the Web album from being uploaded in every synchronization processing.

Image synchronization processing 2 in step S1917 in FIG. 24 will be described next. Situations wherein the CPU 301 determines in step S1916 in FIG. 24 that there is a file name existing in only the Web album are roughly classified into two cases. In the first case, the user has added a new image to the Web album by operating the image addition button 1601 in FIG. 16. In the second case, the user has deleted an image from the local album by operating the image deletion button 710 in FIG. 7.

In the first case, if synchronization processing is executed to match the contents of the Web album with those of the local album, the image added to the Web album by using the image addition button 1601 in FIG. 16 is lost by the synchronization processing.

In the second case, assume that synchronization processing is executed to match the contents of the local album with those of the Web album. Even when the image is deleted from the local album, it is added to the local album again by the synchronization processing unless the image in the Web album is separately deleted.

To avoid these problems, this embodiment executes image synchronization processing in the following way.

Figure 21:
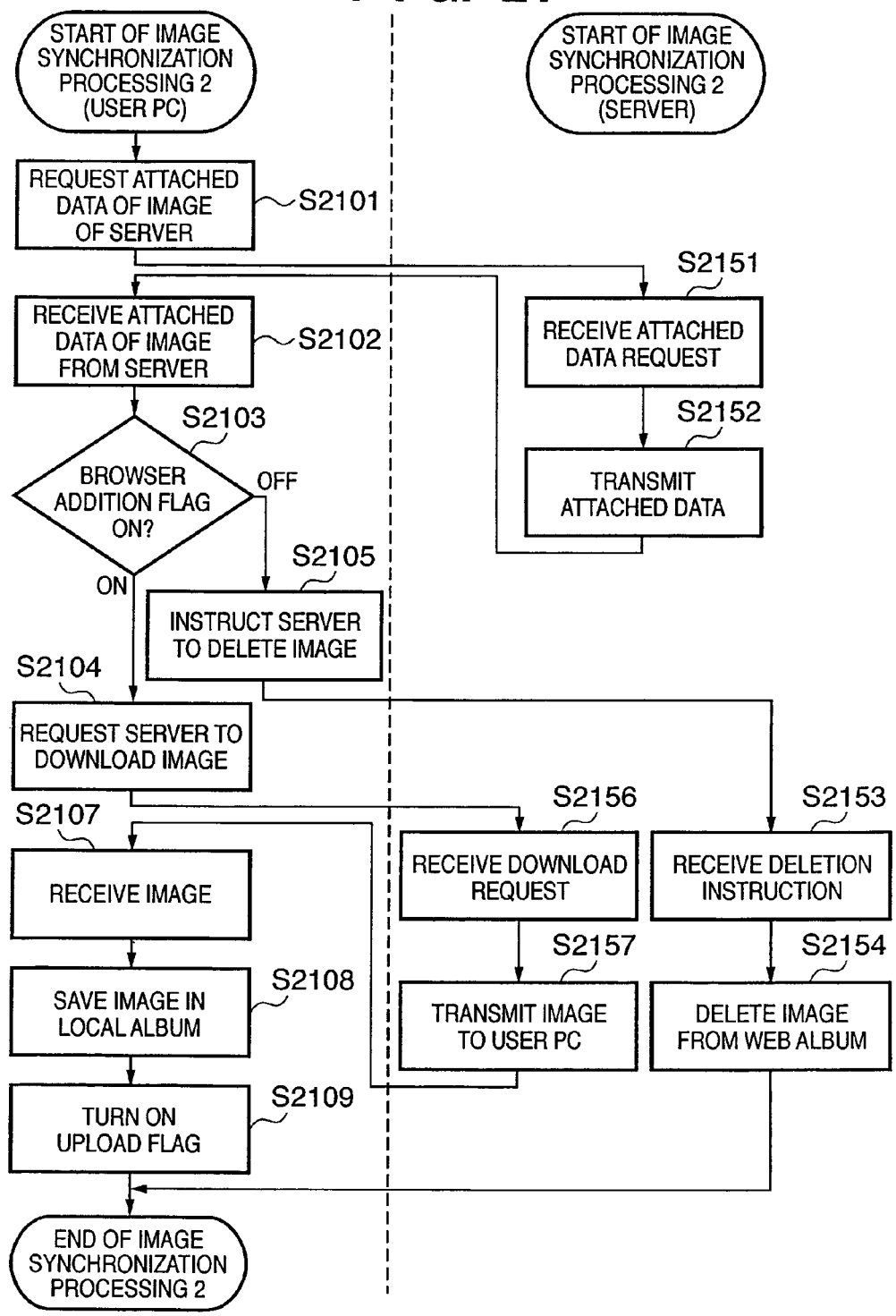
FIG. 21 is a flowchart showing the sub-procedure of image synchronization processing 2.

FIG. 21 shows the sub-procedure of image synchronization processing 2.

In step S2101, the CPU 301 of the user PC 101 requests, of the server 104, attached data 1402 of the image (to be referred to as a "Web synchronous image" hereinafter) existing in only the Web album.

In step S2151, the CPU 201 of the server 104 confirms reception of the request of the attached data 1402 from the user PC 101.

In step S2152, the CPU 201 reads out, from the external storage device 204, the image additional data requested by the user PC 101 and transmits the data to the user PC 101.

In step S2102, the CPU 301 of the user PC 101 confirms reception of the attached data transmitted from the server 104 and saves the received attached data 1402 in the RAM 303.

In step S2103, the CPU 301 determines whether the browser addition flag 1411 in the received attached data 1402 is ON or OFF.

A case wherein the browser addition flag 1411 is OFF will be described. In this case, the CPU 301 determines that an image is deleted from the local album. The processing advances to step S2105.

In step S2105, the CPU 301 transmits, to the server 104, an instruction to delete the Web synchronous image from the external storage device 204.

In step S2153, the CPU 201 of the server 104 confirms reception of the deletion instruction from the user PC 101.

In step S2154, the CPU 201 deletes the Web synchronous image from the external storage device 204. The processing returns to the procedure in FIG. 19.

A case wherein the browser addition flag 1411 is ON in step S2103 will be described.

In this case, the CPU 301 determines that a new image is directly added to the Web album. The processing advances to step S2104.

In step S2104, the CPU 301 requests the server 104 to transmit the Web synchronous image to the user PC 101.

In step S2156, the CPU 201 of the server 104 confirms reception of the download request from the user PC 101.

In step S2157, the CPU 201 copies the Web synchronous image and transmits it to the user PC 101.

In step S2107, the CPU 301 of the user PC 101 confirms reception of the image from the server 104.

In step S2108, the CPU 301 saves the received image in the external storage device 304 as an image in the local album.

In step S2109, the CPU 301 turns on the upload flag of the received image. The processing returns to the procedure in FIG. 19.

This processing prevents the new image added to the Web album from being lost by the synchronization processing. In addition, the image deleted from the local album can automatically be deleted from the Web album.

This synchronization processing is executed when the user clicks on the synchronize button 416 in FIG. 4. The user may also click on the synchronize button 712 in FIG. 7.

In this case as well, processing is executed in accordance with the same procedures as in FIG. 19 except that the synchronization target is an album displayed on the local album image window in FIG. 4. Hence, only album IDs displayed on the local album image window are read out in step S1905 in FIG. 19.

In the present invention, instead of synchronizing albums as synchronization targets, only images in albums with the same album ID are synchronized. This processing allows the user to upload, to the server 104, only albums to be open to the public on the Web while preventing any album to be kept in private from being uploaded to the server 104 by synchronization processing. In addition, since not all albums in the user PC 101 are uploaded automatically by synchronization processing, it is possible to effectively use the capacity of the external storage device 204.

In the present invention, if the user directly adds an image to the Web album, the image is also added to the local album. If the user directly deletes an image from the Web album, the upload flag is turned off without deleting the image in the local album. This processing makes it possible to reflect the state of the Web album on the local album without losing the image from the local album.

Second Embodiment

The second embodiment will be described. The basic arrangement is the same as in the first embodiment. Hence, a description of the same parts as in the first embodiment will be omitted, and characteristic parts in the second embodiment will be described.

In this embodiment, processing of reflecting various kinds of attached data of a Web album, e.g., the number 1408 of viewers, an image comment 1409, and the number 1410 of prints in FIG. 14 on a local album will be described.

The first half of the processing is executed in accordance with the same procedures as in FIG. 19, and a description thereof will be omitted. The procedure shown in FIG. 22 is the same as in FIG. 24 except that step S1918 is added, and a description of the procedure except step S1918 will be omitted.

"Local album" and "Web album" in the description of the procedure (including sub-procedures) indicate albums that are determined in step S1908 to have identical album IDs, unless otherwise specified, as in the first embodiment.

Figure 22:
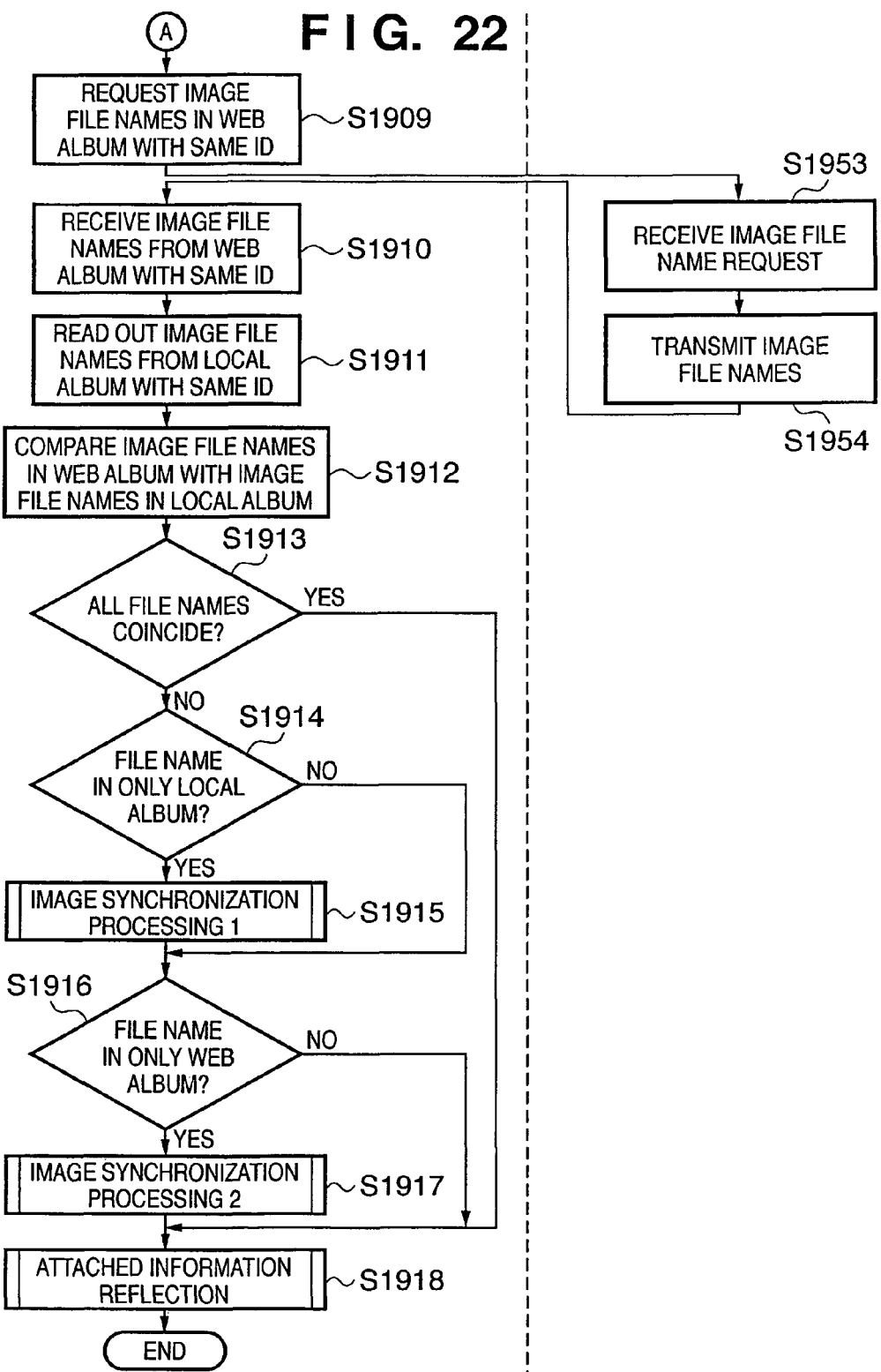
FIG. 22 is a flowchart showing a procedure including processing of reflecting attached data of the Web album on the local album.
Figure 23:
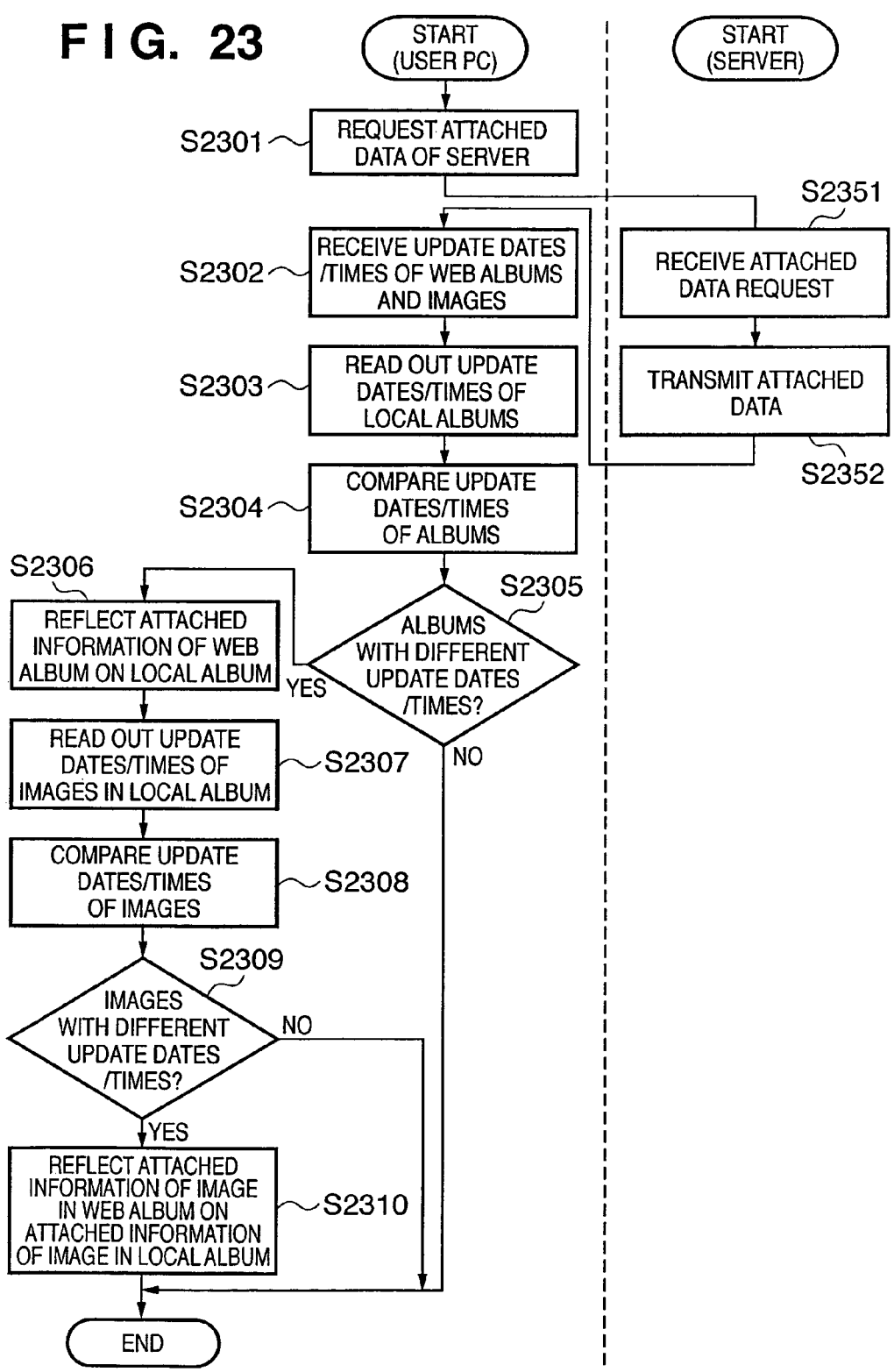
FIG. 23 is a flowchart showing the sub-procedure of the processing of reflecting attached data on the local album.

FIG. 23 shows the sub-procedure in step S1918 in FIG. 22.

The left side of the dotted line in FIG. 23 shows processing executed by a CPU 301 of a user PC 101 in accordance with a program installed in an external storage device 304 accessible from the user PC 101.

The right side of the dotted line in FIG. 23 shows processing executed by a CPU 201 of a server 104 in accordance with a program installed in an external storage device 204 accessible from the server 104.

In step S2301, the CPU 301 requests, of the server 104, attached data 1402 of images in a Web album. The target to request the attached data 1402 includes not only images to be subjected to synchronization in steps S1915 and S1917 in FIG. 24 but also a Web album with a coincident album ID in step S1908 in FIG. 9 and all images in the Web album.

In step S2351, the CPU 201 of the server 104 confirms reception of the request of the attached data 1402.

In step S2352, the CPU 201 transmits the attached data 1402 to the user PC 101.

In step S2302, the CPU 301 of the user PC 101 confirms reception of the attached data 1402 transmitted from the server 104 and saves the attached data 1402 in a RAM 303.

In step S2303, the CPU 301 reads out an update dates/times 813 of images in the local album and stores them in the RAM 303.

In step S2304, the CPU 301 compares Web album update dates/times 1412 in the attached data 1402 stored in the RAM 303 in step S2302 with the local album update dates/times 813 stored in the RAM 303 in step S2303.

If the CPU 301 determines in step S2305 that there are images with different update dates/times as a result of comparison in step S2304, the processing advances to step S2306. If NO in step S2305, the processing is complete.

In step S2306, the CPU 301 reflects the information of the Web album on the local album with the different update date/time. More specifically, the CPU 301 acquires the number 1307 of viewers, an album comment 1308, and the number 1309 of prints from attached data 1302 of the Web album in FIG. 13 and overwrites them on corresponding attached data 602 in the local album. The CPU 301 may acquire all the attached data 602 of the Web album and update the attached data 602 of the local album.

In steps S2307 to S2310, the same processing as in steps S2303 to S2306 is executed for each image. In this case, the CPU 301 reflects the number 1408 of viewers, an image comment 1409, and the number 1410 of prints in FIG. 14 on attached data 802 in FIG. 8.

The attached data 602 reflected on the local album and images in it remain even when the Web album is deleted from the server 104. In copying and transmitting the local album in accordance with the procedures in FIG. 9, the attached data 602 are also copied. Hence, when the user uploads a temporarily deleted album to the server 104 again as a Web album, the attached data of the Web album inherit the date before deletion. For example, assume that the number 1307 of viewers of the Web album at the time of deletion is 20, and this is reflected on the number 607 of viewers of the local album. When the user uploads the same local album again, the number 1307 of viewers of the Web album is 20. If a third party has browsed the album, the number 1307 of viewers changes to 21.

The second embodiment executes processing of reflecting the attached data of a Web album on a local album, in addition to the processing of the first embodiment.

This processing enables the user to confirm the Web album browsing state, print state, and friends' comments simply by checking the local album.

The same album that is uploaded again inherits the attached data. Hence, the user can easily delete or upload the Web album, making it possible to effectively use the limited capacity of the server.

According to the above-described embodiments, the user can synchronize images simply by instructing to execute synchronization processing while reflecting his/her intension of whether to make an image open to the public.

Other Embodiment

The present invention is applicable not only to an image but also to various content data such as a moving image, music, and document.

The object of the present invention is achieved by using a recording medium which records software program codes to implement the functions of the above-described embodiments. More specifically, the object is achieved when the computer (or CPU or MPU) of a system or apparatus reads out and executes the program codes stored in the recording medium. In this case, the program codes read out from the storage medium implement the functions of the above-described embodiments by themselves. The storage medium which stores the program codes constitutes the present invention.

Examples of the storage medium to supply the program codes are a floppy® disk, hard disk, optical disk, magnetooptical disk, CD-ROM, CD-R, magnetic tape, nonvolatile memory card, ROM, and DVD.

The functions of the above-described embodiments are implemented not only when the computer executes the readout program codes but also when the OS (Operating System) running on the computer partially or wholly executes actual processing on the basis of the instructions of the program codes.

The program codes read out from the storage medium may be written in the memory of a function expansion board inserted into the computer or a function expansion unit connected to the computer. In this case, the CPU of the function expansion board or function expansion unit partially or wholly executes actual processing on the basis of the instructions of the written program codes. The present invention also incorporates this case.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-316713, filed Oct. 31, 2005, which is hereby incorporated by reference herein in its entirety.

What is claimed is:

1. An information processing apparatus comprising:
at least one processor constructed to execute the following computer-executable processes steps:
a first transmission step of copying a plurality of contents stored in a storage device as groups and transmit each group of contents to an external device connected through a communication link;
an instruction step of instructing to synchronize the content stored in the storage device with the content transmitted by said first transmission step and stored in the external device;
a reception step of receiving, from the external device on the basis of the instruction, identification information to identify a group of contents stored in the storage device;
a comparison step of determining whether the identification information received by said reception step matches identification information of a group of contents stored in the external device;
a synchronization step of synchronizing contents that belong to groups stored in the storage device that are determined to have identification information that matches identification information of groups stored in the external device, as determined by said comparison step;
a copy information setting step of setting copy information representing that a content identical to the content stored in the storage device and transmitted by said first transmission step exists in the external device;
a first editing step of instructing to add/delete a content to/from the group stored in the storage device; and
a second editing step of instructing to add/delete a content to/from the group stored in the external device independently from said first editing step,
wherein if a content is added to the group stored in the storage device in response to an instruction from said first editing step, said synchronization step copies the added content to the external device, and if a content is deleted from the group stored in the storage device in response to an instruction from said first editing step, said synchronization step deletes the content stored in the external device which is identical to the content deleted from the group stored in the storage device;
wherein if a content is added to the external device in response to an instruction from said second editing step, said synchronization step copies the added content to the storage device, and if a content is deleted from the external device in response to an instruction from said second editing step, said synchronization step cancels the copy information set in correspondence with a content that is identical to the deleted content and is stored in the storage device.

2. The apparatus according to claim 1, wherein the group stored in the external device can be displayed or edited when a plurality of user terminals connect to the external device through the communication link.

3. The apparatus according to claim 1, wherein the computer-executable process steps include further comprising an inhibition information setting step unit which sets inhibition information indicating inhibition of synchronization of the content stored in the storage device by said synchronization step unit,
wherein if said synchronization step unit has canceled the copy information, said inhibition information setting step unit sets the inhibition information.

4. The apparatus according to claim 1, wherein said synchronization step reflects attached information of the content stored in the external device on attached information of the content stored in the storage device.

5. An information processing method comprising:
using at least one processor to execute the following computer-executable processes steps:
a first transmission step of copying a plurality of contents stored in a storage device as groups and transmitting each group of contents to an external device connected through a communication link;
an instruction step of instructing to synchronize the content stored in the storage device with the content transmitted in the first transmission step and stored in the external device;
a reception step of receiving, from the external device on the basis of the instruction, identification information to identify a group of contents stored in the storage device;
a comparison step of determining whether the identification information received in the reception step matches identification information of a group of contents stored in the external device;
a synchronization step of synchronizing contents that belong to groups stored in the storage device that are determined to have identification information that matches identification information of groups stored in the external device, as determined in the comparison step;
a copy information setting step of setting copy information representing that a content identical to the content stored in the storage device and transmitted by said first transmission step exists in the external device;

a first editing step of instructing to add/delete a content to/from the group stored in the storage device; and a second editing step of instructing to add/delete a content to/from the group stored in the external device independently from said first editing step, wherein if a content is added to the group stored in the storage device in response to an instruction by said first editing step, said synchronization step copies the added content to the external device, and if a content is deleted from the group stored in the storage device in response to the instruction by said first editing step, said synchronization step deletes the content stored in the external device which is identical to the content deleted from the group stored in the storage device;

wherein if a content is added to the external device in response to an instruction by said second editing step, said synchronization step copies the added content to the storage device, and if a content is deleted from the external device in response to the instruction by said second editing step, said synchronization step cancels the copy information set in correspondence with a content that is identical to the deleted content and is stored in the storage device.

6. A non-transitory computer readable storage medium retrievably storing a computer-executable program therein, the computer-executable program causing a computer to perform an information processing method, said method comprising:

a first transmission step of copying a plurality of contents stored in a storage device as groups and transmitting each group of contents to an external device connected through a communication link;

an instruction step of instructing to synchronize the content stored in the storage device with the content transmitted in the first transmission step and stored in the external device;

a reception step of receiving, from the external device on the basis of the instruction, identification information to identify the group stored in the storage device;

a comparison step of determining whether the identification information received in the reception step matches identification information of a group of contents stored in the external device;

a synchronization step of synchronizing contents that belong to groups stored in the storage device that are determined to have identification information that matches identification information of groups stored in the external device, as determined in the comparison step;

a copy information setting step of setting copy information representing that a content identical to the content stored in the storage device and transmitted by said first transmission step exists in the external device;

a first editing step of instructing to add/delete a content to/from the group stored in the storage device; and a second editing step of instructing to add/delete a content to/from the group stored in the external device independently from said first editing step, wherein if a content is added to the group stored in the storage device in response to an instruction by said first editing step, said synchronization step copies the added content to the external device, and if a content is deleted from the group stored in the storage device in response to the instruction by said first editing step, said synchronization step deletes the content stored in the external device which is identical to the content deleted from the group stored in the storage device;

wherein if a content is added to the external device in response to an instruction by said second editing step, said synchronization step copies the added content to the storage device, and if a content is deleted from the external device in response to the instruction by said second editing step, said synchronization step cancels the copy information set in correspondence with a content that is identical to the deleted content and is stored in the storage device.

* * * * *